United States Patent [19]

Izu et al.

[11] 4,211,838

[45] Jul. 8, 1980

[54] METHOD OF HIGH SENSITIVITY IMAGING AND IMAGING FILM THEREFOR

[75] Inventors: Masatsugu Izu, Birmingham; Vincent D. Cannella, Detroit, both of Mich.

[73] Assignee: Energy Conversion Devices, Inc., Troy, Mich.

[21] Appl. No.: 827,470

[22] Filed: Aug. 25, 1977

[51] Int. Cl.[2] .......................... G03C 1/00; G03C 5/24; G01D 15/24; G01D 15/10

[52] U.S. Cl. .................................. 430/502; 250/316.1; 250/317.1; 346/135.1; 346/76 R; 346/76 L; 427/53.1; 427/56.1; 427/255.3; 427/255.7; 427/250; 427/251; 428/621; 428/629; 428/632; 428/639; 428/642; 428/645; 428/646; 428/657; 428/658; 428/686; 428/913; 430/346; 430/964

[58] Field of Search .................... 96/88, 27 E, 48 PQ, 96/48 R; 427/56, 53, 250, 248 J, 248 C, 251; 428/469, 457, 913, 621, 629, 632, 639, 642, 645, 646, 657, 658, 686; 250/316, 317; 346/135, 76 R, 76 L

[56] References Cited

U.S. PATENT DOCUMENTS

| | | | |
|---|---|---|---|
| 3,306,768 | 2/1967 | Peterson | 427/248 C |
| 3,556,837 | 1/1971 | Hammond | 427/250 |
| 3,889,272 | 6/1975 | Lou et al. | 346/135 |
| 4,000,334 | 12/1976 | Hallman et al. | 96/27 E |
| 4,000,492 | 12/1976 | Willens | 428/457 |
| 4,137,078 | 1/1979 | Izu et al. | 96/48 PQ |

OTHER PUBLICATIONS

*Encyc. of Chem. Techn.*, Kirk-Othmer, vol. 13, 1967, pp. 278 & 279.

*Primary Examiner*—Richard L. Schilling

*Attorney, Agent, or Firm*—Wallenstein, Spangenberg, Hattis & Strampel

[57] ABSTRACT

A dry process high sensitivity imaging film includes a solid, high optical density and substantially opaque film of dispersion imaging material deposited on a substrate. The film of dispersion imaging material comprises a plurality of separate layers of different and substantially mutually insoluble metal components having relatively high melting points and relatively low melting point eutectics, and interfaces between said layers having relatively low melting points. Energy is applied to the film of dispersion imaging material, in an amount above a certain critical value sufficient to increase the absorbed energy in the film material above a certain critical temperature value related to the relatively low melting points of the interfaces, to substantially melt the low melting point interfaces and incorporate the different and substantially mutually insoluble components of the separate layers into the substantially molten interfaces and, hence, to change the film to a substantially fluid state in which the surface tension of the film material acts to cause the substantially opaque film, where subject to said energy, to disperse and change to a discontinuous film comprising openings and deformed material which are frozen in place following the application of energy and through which openings light can pass for decreasing the optical density thereat. Also, means may be associated with the film of dispersion imaging material for retarding the dispersion and change to the discontinuous film, caused by the surface tension, and for controlling the amount of such dispersion and change in accordance with the intensity of the applied energy above said certain critical value to provide continuous tone imaging of the dry process imaging film.

34 Claims, 12 Drawing Figures

METHOD OF HIGH SENSITIVITY IMAGING AND IMAGING FILM THEREFOR

This application is generally related to (1) application Ser. No. 162,842, filed July 15, 1971, by Robert W. Hallman, Stanford R. Ovshinsky and John P. deNeufville and now abandoned; (2) pending application Ser. No. 577,003, filed May 13, 1975 by Robert W. Hallman, Stanford R. Ovshinsky and John P. deNeufville, as a division and continuation-in-part of said application Ser. No. 162,842; (3) application Ser. No. 407,944 filed Oct. 19, 1973, by Robert W. Hallman, Stanford R. Ovshinsky and John P. deNeufville, as a continuation-in-part of said application Ser. No. 162,842 and now U.S. Pat. No. 4,000,334; (4) pending application Ser. No. 507,049, filed Sept. 18, 1974, by Harvey H. Wacks and Donald J. Sarrach, now abandoned, and replaced by continuation application Ser. No. 770,076, filed Feb. 18, 1977; (5) pending application Ser. No. 725,926, filed Sept. 23, 1976, by Masatsugu Izu and Stanford R. Ovshinsky and now U.S. Pat. No. 4,082,861; (6) application Ser. No. 458,715, filed Apr. 8, 1974, by Harvey H. Wacks, Peter H. Klose, Stanford R. Ovshinsky and Robert W. Hallman and now U.S. Pat. No. 3,966,317; (7) pending application Ser. No. 742,645, filed Nov. 17, 1976, by Peter H. Klose and Stanford R. Ovshinsky; and (8) pending application Ser. No. 724,084, filed Sept. 16, 1976, by Stanford R. Ovshinsky, Peter H. Klose and Wayne P. Messing.

Briefly, and generally, the first three of the aforementioned applications, Ser. Nos. 162,842, 577,003 and 407,944, are directed to a dry process imaging system utilizing a solid, high optical density and substantially opaque film of a dispersion imaging material deposited on a substrate which, upon application of energy thereto in an amount sufficient to increase the absorbed energy in the film material above a certain critical value, is capable of dispersing and changing, where subject to said energy, to a discontinuous film comprising globules and free space therebetween which are frozen in place following the application of such energy and through which free space light can pass for decreasing the optical density thereat.

The fourth of the aforementioned applications, Ser. No. 507,049, is directed to the imaging system, discussed above in connection with the first three applications, but, in addition, it includes a thin polymeric overcoat film for protection against abrasion or the like.

The fifth of the aforementioned applications, Ser. No. 725,926, is directed to the imaging system, discussed above in connection with the first four applications, and is directed generally to two basic improvements therein:

(1) wherein means are associated with the film of dispersion imaging material for retarding the dispersion and change to the discontinuous film and for controlling the amount of such change in accordance with the intensity of the applied energy above the certain critical value to increase the amount of such dispersion and change and the area of the openings in the film and decrease the area of the globules or deformed material and, therefore, the optical density of the film in accordance with the intensity of the applied energy above the certain critical value for providing continuous tone imaging of the dry process imaging film;

and (2) wherein the film of dispersion imaging material comprises an alloy of a plurality of substantially mutually insoluble solid components having a low melting point eutectic within its system, so that, when energy is applied to the film material in an amount to increase the absorbed energy in the film above a certain critical value related to the melting point of the eutectic thereof, the film is dispersed and changed, where subject to the energy, to the discontinuous film having the globules or deformed material and the openings or free space which are frozen in place following the application of energy and through which openings or free space light can pass for decreasing the optical density of the film thereat with a minimum intensity of applied energy.

The sixth and seventh of the aforementioned applications, Ser. Nos. 458,715 and 742,645, are directed to a dry process apparatus for producing archival microform records from light reflecting hard copy and which may utilize as a part thereof an imaging system including radiant energy and the film of dispersion imaging material as set forth in the first five of the aforementioned applications. The eighth of the aforementioned applications, Ser. No. 724,084, is directed to a data storage and retrieval system which may utilize as a part thereof a recording system including joule heat energy and the film of dispersion imaging material as set forth in the first five of the aforementioned applications.

The principal object of this invention is to provide an improved dry process high sensitivity imaging film, which can be effectively utilized in the dry process apparatus for producing archival microform records as disclosed in the aforementioned sixth and seventh applications and effectively utilized in the dry process data storage and retrieval system disclosed in the aforementioned eighth application, and which constitutes a decided improvement over the dry process imaging films disclosed in the first five of the aforementioned applications, and more particularly the fifth.

Other objects of this invention reside in the method of producing an image by a dry process with a minimum of applied energy and in the method of making a dry process high sensitivity imaging film.

Among the various forms of the invention of the aforementioned fifth application, Ser. No. 725,926, that application discloses a dry process high sensitivity imaging film including a substrate and a solid high optical density and substantially opaque film of a dispersion imaging material deposited on the substrate, wherein the deposited film material comprises an alloy of a plurality of substantially mutually insoluble solid components and having a relatively low melting point eutectic within its system. Upon application of energy in an amount sufficient to increase the absorber energy in the deposited alloy film above a certain critical value related to the low melting point value of the alloy eutectic, the deposited film changes to a substantially fluid state in which the surface tension of the film material acts to cause the substantially opaque film, where subject to said energy, to disperse and change to a discontinuous film comprising openings and deformed material which are frozen in place following said application of energy and through which openings light can pass for decreasing the optical density thereat. As a result, the solid film of dispersion imaging material can disperse and change to the discontinuous film with less intensity of the applied energy than if the film did not comprise an alloy having a relatively low melting point eutectic within its system, thereby providing a high sensitivity imaging film.

In connection with the aforementioned form of the invention of the fifth application, that application specifically discloses that the film of imaging material comprises a single layer of alloy material which is substantially homogeneous or uniform throughout the alloy layer, but which is microheterogeneous with respect to the substantially mutually insoluble solid components forming the eutectic and the excess of such components off the eutectic of such single alloy layer. The aforementioned fifth application also discloses and contemplates the simultaneous deposition of the substantially mutually insoluble components of the alloy in a single deposition step to achieve the substantially homogeneous or uniform single alloy layer. Due to differences in the characteristics of the components forming the alloy layer, including, among others, their evaporation temperatures and the like, it has been difficult to obtain a homogeneous or uniform layer of the deposited alloy and to control the relative amounts of the components making up the deposited alloy layer.

More specifically, an object of this invention is to provide a dry process high sensitivity imaging film which eliminates the foregoing difficulties and problems encountered in the high sensitivity imaging film of the aforesaid fifth application.

Like the aforementioned fifth application, the instant invention is directed to a dry process high sensitivity imaging film comprising a substrate, and a solid, high optical density and substantially opaque film of dispersion imaging material deposited on the substrate. Here, however, the film of dispersion imaging material deposited on the substrate includes a plurality of separate layers of different and substantially mutually insoluble metal components having relatively high melting points and relatively low melting point eutectics, and interfaces between said layers having relatively low melting points. The relatively low melting points of the interfaces between the separate layers correspond generally to the relatively low melting point eutectic of the metal components of the separate layers. An overcoat layer is preferably deposited on the outer surface of the film of dispersion imaging material.

Energy is applied to such film of dispersion imaging material, in an amount above a certain critical value sufficient to increase the absorbed energy in the film material above a certain critical temperature value related to the relatively low melting points of the interfaces, to substantially melt the low melting point interfaces and incorporate the different and substantially mutually insoluble components of the separate layers into the substantially molten interfaces and, hence, to change the film to a substantially fluid state in which the surface tension of the film material acts to cause the substantially opaque film, where subject to said energy, to disperse and change to a discontinuous film comprising openings and deformed material which are frozen in place following the application of energy and through which openings light can pass for decreasing the optical density thereat, thereby providing a high sensitivity imaging film.

The deposited separate layers of the different and substantially insoluble components having relatively high melting points and relatively low melting point eutectics provide low melting point interfaces therebetween which may have low melting points due to the energy of mixing of the separate components at the interfaces, or which may comprise a layer of a eutectic mixture of the separate components which layer may be microscopically thin. The application of the applied energy above the certain critical value causes the components at the interfaces to substantially melt and to cause the components of the separate layers to be broken up and at least substantial amounts thereof to be incorporated in the melt. As a result, the solid imaging film, including the separate layers, is changed to a substantially fluid state wherein the surface tension thereof causes the film to disperse and change to the discontinuous film. Due to the low melting points, this occurs at a low intensity of the applied energy and, therefore, provides a high sensitivity imaging film.

As used herein, the term "substantially fluid state" means a state wherein the material can move or flow and be deformed by the surface tension of the material and which can have in such state various degrees of fluidity or viscosity depending upon the nature of the material and the temperatures thereof. The term "surface tension" also contemplates the effects of interfacial phenomena between adjacent surfaces. The terms "dispersion" and "disperse" means the changing of the solid film of material to the discontinuous film comprising openings and deformed material by surface tension of the material while in the substantially fluid state.

By utilizing a plurality of separate layers of different and substantially mutually insoluble components having relatively low melting point eutectics and relatively low melting point interfaces therebetween, as aforesaid, the foregoing difficulties and problems encountered in the aforementioned fifth application are eliminated and numerous improvements and advantages are brought about. Among others, the need for providing a substantially homogenous or uniform layer of a deposited alloy and the difficulties involved in doing so are eliminated. The difficulties in controlling the relative amounts of the components making up such a deposited alloy layer are also eliminated. Appropriate components for the respective separate layers may be selected and readily and simply deposited on the substrate in desired amounts and in desired orders for providing the film of dispersion imaging material with desired characteristics, as for example, the melting points of the low melting point interfaces between the layers, the intensity of the energy applied to disperse and change the film of dispersion imaging material to the discontinuous film, the crystalline structures of the layers of the film, the formation of a high contrast imaging film having a high gamma or continuous tone imaging film having a low gamma, and the like.

When the film of dispersion imaging material of this invention is changed to the substantially fluid state by the application of energy above the certain critical value, the surface tension of the material causes the dispersion imaging material in the film to deform and produce openings in the film. In this deformation of the dispersion imaging material in the substantially fluid state, in accordance with one phase of this invention, the deformed material continues to roll back substantially instantaneously from the initial openings into small spaced globules with free space therebetween providing minimal deformed material area and maximal free space in the discontinuous film which are frozen in place following the application of the energy. This substantially instantaneous and full change of the film of dispersion imaging material to such discontinuous film provides high contrast imaging having a high gamma as distinguished from continuous tone or gray scale imaging having a low gamma. In the deformation of the dispersion imaging material in the substantially fluid state, in accordance with another phase of this invention, the roll back of the material from the initial openings is retarded and the amount of such roll back is controlled in accordance with the intensity of the applied energy above the certain critical value related to the relatively low melting points of the interfaces for providing continuous tone or gray scale imaging having a low gamma as distinguished from the high contrast imaging having a high gamma. In both instances the dispersion imaging films are high sensitivity films requiring a minimum intensity of the applied energy for causing dispersion thereof.

The gammas of these high sensitivity films, for providing high contrast imaging or continuous tone or gray scale imaging, have been found to be a function of several parameters which can be controlled. Briefly, among these parameters are: the relative thickness of each component layer; the density of roll back nucleation points as well as impediments to roll back provided by both cumulative crystal structure, solids, and impurities introduced into the film; the combined thermal properties of the component layers, substrate, overcoat and passivation layers; and the crystal grain size and orientation in the component layers.

In the high contrast imaging films, having a high gamma, the parameters of the dispersion imaging material are such as to provide substantially no retarding of the roll back of the material in its substantially fluid state from the initial openings therein so that the roll back is substantially instantaneous and substantially complete upon application of the applied energy above the certain critical value. The parameters can be such as to assure such substantially instantaneous and complete roll back.

As distinguished from the high contrast imaging films, having a high gamma, in the continuous tone or gray scale imaging films, having a low gamma, the parameters are such as to provide means associated with the film of dispersion imaging material for retarding the dispersion and change to the discontinuous film, caused by the surface tension, and for controlling the amount of such dispersion and change in accordance with the intensity of the applied energy above said certain critical value to increase the amount of said change and the area of the openings in the film and to decrease the area of the deformed material in the film and, therefore, the optical density of the film in accordance with the intensity of the applied energy above said critical value for providing continuous tone or gray scale imaging of the dry-process imaging film. In this respect, the retarding and controlling means associated with the film of dispersion imaging material retards the roll back of the deformed material from the initial openings in the film and controls the amount of such roll back of the deformed material in accordance with the intensity of the applied energy above said certain critical value.

When the intensity of the applied energy is below a certain critical value, no dispersion or change in optical density takes place in the film of dispersion imaging film which is a factor in producing archival properties in the film. In the continuous tone or gray scale imaging phase of this invention, when the intensity of the applied energy is just above the certain critical value, the dispersion imaging material in the film is deformed a small amount to provide small area openings in the film, there being only a small amount of roll back of the deformed material from the openings. As a result, the area of the substantially opaque deformed material is extremely large while the area of the openings is extremely small. The transmissivity of the film is low but more than that of the substantially opaque undispersed film. Thus, the optical density of the film, where subjected to such application of energy, is decreased a small amount.

When the intensity of the applied energy is increased a further amount, there is an increased amount of change and of roll back of the deformed material from the openings. As a result, the area of the substantially opaque deformed material is decreased while the area of the openings is increased. The transmissivity of the film is increased, and, thus, the optical density of the film, where subjected to the applied energy of such increased intensity, is decreased an additional amount. Further increases in intensity of the applied energy above said certain critical value provide corresponding decreases in optical density in the discontinuous film, the area of the deformed material therein being correspondingly decreased and the area of the openings therein being correspondingly increased. When the intensity of the applied energy is increased to a maximum, the deformed material is reduced in area to small spaced globules with the area of the openings increased to form free space between the globules to provide a minimum optical density in the film where subject to such applied energy of maximum intensity.

Thus, in accordance with this continuous tone or gray scale imaging phase of this invention, the application of energy of different intensities above a certain critical value to the substantially opaque film of dispersion imaging material provides different amounts of dispersion or change to the discontinuous film and, hence, different values of optical density for continuous tone or gray scale imaging. Basically, in accordance with an operating mechanism here involved, the continuous tone or gray scale imaging is determined by the amount of edge roll back of the deformed material of the film in its substantially fluid state from the openings produced therein in accordance with the intensity of the applied energy.

In one case of the operating mechanism, the amount of edge roll back of the deformed material in accordance with the intensity of the applied energy may be determined and stopped while the deformed material is in its substantially fluid state, and this may be substantially regardless of the length of time of application of the applied energy. Here, a substantially equilibrium condition may be reached in the substantially fluid material whereby the edge roll back is retarded and stopped while the deformed material is still in its substantially fluid state and frozen in place upon subsequent solidification of the deformed material. The energy may be applied in a short pulse, if desired.

In another case of the operating mechanism, the amount of edge roll back of the deformed material in accordance with the intensity of the applied energy may be determined by the solidifying rate of the deformed material from its substantially fluid state to its solid state following the application of applied energy and the roll back velocity of the deformed material in its substantially fluid state while it is cooling to its solid state following the application of the applied energy. Here, a substantially kinetic condition may be involved in the substantially fluid material whereby the edge roll back is retarded and is stopped when the deformed material is solidified and frozen in place. Here, the energy is preferably applied in a short pulse. While these different cases of the operating mechanism are herein set forth for purposes of explanation, they may be both involved in obtaining continuous tone or gray scale imaging in accordance with this invention wherein the change to the discontinuous film, caused by the surface tension, is retarded and wherein the amount of such change is controlled in accordance with the intensity of the applied energy above the certain critical value.

Following the application of the energy the solidification rate may be dependent upon the roll back point density of the film of dispersion imaging material wherein there are provided roll back points toward which the deformed material in the film in its substantially fluid state moves or rolls back from the openings formed in the film. As compared to the high contrast imaging film of dispersion imaging material, the roll back point density generally may be relatively high for the continuous tone or gray scale imaging film, there being a relatively large number of roll back points per unit area of the film and, hence, relatively small volumes of deformed material in the fluid state between the openings in the film to be further deformed and rolled back toward the roll back points. Because of the relatively small volumes of the deformed material in the substantially fluid state, the solidification rate from the fluid state to the solid state following the application of the energy, may be more rapid than that of the high contrast dispersion imaging films having a relatively low roll back point density and relatively large volumes of deformed material. In the case of the operating mechanism, where the roll back is stopped when the substantially fluid material is solidified to the solid state, the relatively rapid solidification rate makes it possible to stop and freeze the roll back of the deformed material, due to the surface tension of the deformed material in the fluid state, before the roll back is completely accomplished, to provide only a partial roll back and, hence, only a partial dispersion or change of the film toward the discontinuous film.

The roll back point density and, hence, the volumes of the deformed dispersion imaging material in the substantially fluid state and the solidification rate are controlled by design parameters involved in the making of the continuous tone or gray scale dry process imaging film of this invention. In this respect, the surfaces of the substrate or overcoat or passivation layers or the interfaces thereof with the imaging material may have an uneveness or surface condition which provides roll back points for the dispersion imaging material of the film in its substantially fluid state toward which the substantially fluid material rolls back from openings formed in the film. Roll back points can also be provided in the film of dispersion imaging material itself in lieu of or in addition to the roll back points a the aforesaid surfaces or interfaces. In this respect, the imaging film may have solids or inpurities, such as oxides or the like, which form boundaries to effect roll back point densities and roll back volumes and to limit the sizes of the final frozen deformed material in the discontinuous film. The solids or impurities may be introduced into the component layers themselves or be applied as layers to the component layers. Also, in this respect, spaced points in the low melting point interfaces between the separate layers having the different components probably can melt sooner than other points therein which melt later, the former points providing for the formation of the openings in the film and the latter points providing nucleation centers or roll back points toward which the substantially fluid material rolls back from the openings formed in the film.

The solidifying rate can also be controlled by controlling the bulk film structure and mass mobility of the dispersion imaging material in its substantially fluid state. A pure homogeneous dispersion imaging material in cooling from its substantially fluid state to its solid state may well be supercooled below the solidification temperature before it reaches its solid state, thereby allowing additional time for roll back of the material before it becomes solidified. By providing the dispersion imaging material in its substantially fluid state with solids, impurities or the like, incorporated in the component layers or applied as layers to the component layers, to make it microheterogeneous, such supercooling is largely eliminated so that cooling or quenching or solidifying of the substantially fluid material to the solid state is brought about directly and most rapidly. Such solids, impurities or the like, in addition to speeding up solidification to the solid state, may also operate to reduce the mass mobility and retard the amount of edge roll back of the deformed material it its substantially fluid state from the openings in the film. In this respect, such solids, impurities or the like, form boundaries which limit the effective roll back volume and thus the final size of the deformed material. Such a microheterogeneous film of dispersion imaging material, having such solids, impurities or the like, may comprises multiple components and phase boundaries and interfaces therebetween. The microheterogeneous film can have areas having a distribution of critical energy sensitivities. In this case the numbers and/or size of the initial small openings in the film will change in proportion to the applied energy.

Such a microheterogeneous film of dispersion imaging material is provided in accordance with this invention by the plurality of separate layers of different and substantially mutually insoluble components having relatively high melting points and relatively low melting point eutectics and interfaces between said layers having relatively low melting points, the relatively low melting points of the interfaces between the separate layers corresponding generally to the relatively low melting point eutectic of the components of the separate layers. The relatively high melting point components of the separate layers may form solids or barriers before they are absorbed in the molten material and may operate to reduce the mass mobility of the molten material, this being particularly true when the amounts of the components of the layers are off the eutectic thereof. Such a microheterogeneous film may also be provided by incorporating in the component layers themselves or by providing separate layers of other solids or impurities, such as, oxides or the like, for reducing the mass mobility of the molten material. The solid components of the separate layers of the dispersion imaging film, the other solids or impurities incorporated in the component layers, or the separate layers of solids or impurities provided in the film must be broken up and carried along with the material in its substantially fluid state as it is being rolled back by the surface tension of the material in its substantially fluid state, which operate to retard the amount of edge roll back of the material and the change to the discontinuous film. The crystal grain size and the orientation of the crystals in the component layers of the dispersion imaging material and the formation of oxides along the grain boundaries thereof may also have an effect upon the mass mobility of the material.

In the continuous tone or gray scale imaging phase of the instant invention, the control of the amount of edge roll back may be determined by the microheterogeneous nature of the film of dispersion imaging material, as referred to above, and/or by the interfacial adhesion between the film of dispersion imaging material and the substrate, overcoat film and/or passivation layers therebetween.

The film of dispersion imaging material deposited on the substrate can result in interfacial adhesion therebetween which can oppose, as for example, by wetting or friction or the like, the surface tension force of the material in its substantially fluid state to roll back the material and, thus, also decrease the edge roll back velocity and the amount of roll back and retard the change of the material to the discontinuous film. The interfacial adhesion effect is taken into account in the aforementioned definition of "surface tension". However, the interfacial adhesion is never so great as to prevent the surface tension force of the material in its fluid state from rolling back the material.

As expressed above, the film of dispersion imaging material deposited on the substrate preferably has an overcoat film deposited thereover which also can result in interfacial adhesion therebetween which also can oppose, as for example, by wetting or friction or the like, the surface tension force of the material in its substantially fluid state to roll back the material. This interfacial adhesion between the dispersion imaging material and the overcoat film, in addition to having an effect upon the roll back point density, also can decrease the edge roll back velocity and the amount of roll back and retard the change of the material to the discontinuous film. The overcoat film, as it is deposited on the outer surface of the film dispersion imaging material, can follow the contour of the latter and can provide effective retarding of the change of the material to the discontinuous film. Here, also, this interfacial adhesion is never so great as to prevent the surface tension from rolling back the material.

The interfacial adhesion between the film of dispersion imaging material and the substrate and the overcoat can be affected by the different components of the separate layers where they interface with the substrate and overcoat or with passivating layers deposited therebetween and by the nature of the substrate, overcoat or passivating layers. Relative degrees of interfacial adhesion can have an effect upon the high sensitivity film of dispersion imaging material as to whether it is high contrast imaging or continuous tone or gray scale imaging.

As expressed above, when the film of dispersion imaging material is subjected to energy in an amount sufficient to increase the absorbed energy in the material to above the certain critical energy value, the material assumes a substantially fluid state in which the surface tension of the material acts to cause the film to disperse and change to a discontinuous film comprising openings and deformed material which are frozen in place following the application of said energy. In the continuous tone or gray scale imaging phase of this invention, the greater the intensity of the applied energy, the higher becomes the temperature of the material in its substantially fluid state and the greater the amount of the roll back of the deformed material and the greater the amount of the dispersion or change of the material to the discontinuous film comprising openings and deformed material which are frozen in place.

In one instance of said one case of the operating mechanism referred to above wherein the roll back of the substantially fluid material is stopped while the material is substantially fluid, the amount of the solid component in the separate layers with respect to the substantially fluid material decreases as the temperature of the film is increased above the eutectic of the separate layers and, therefore, provides less resistance or impediment to the roll back of the substantially fluid material at higher temperatures than at lower temperatures. Thus, for higher temperatures there will be more roll back of the substantially fluid material than for lower temperatures and, hence, more roll back for higher intensities of the applied energy than for lower intensities thereof. In another instance of said one case of the operating mechanism, the different solids or impurities, which are incorporated in the component layers or provided by separate layers thereof and which retard or impede the roll back of the substantially fluid imaging material, have a lesser resistance or impediment to the roll back of the substantially fluid imaging material as the temperature of the material is increased above the eutectic of the separate layers. Thus, also, here, for higher temperatures there will be more roll back of the substantially fluid material than for lower temperatures and, hence, more roll back for higher intensities of the applied energy than for lower intensities thereof. The amount of dispersion or change to the discontinuous film, i.e., from no dispersion or change to full dispersion or change and degrees of partial dispersion or change therebetween is thereby readily controlled.

In said other case of the operating mechanism referred to above, where the amount of roll back of the substantially fluid material is dependent upon the roll back velocity of the fluid material while it is being cooled to its solid state, the higher the temperature of the substantially fluid material, the longer it takes to cool or quench or solidify and the more the amount of roll back until it is frozen into its solid state. The temperature of the substantially fluid material from which it cools and solidifies following the application of the energy are dependent upon the intensities of the applied energy. The energy is preferably applied in a short pulse. Since the cooling or quenching or solidification of the film of dispersion imaging material from its substantially fluid state to its solid state is made to occur rapidly and since the dispersion or change of the material to the discontinuous film is retarded, all as expressed above, the amount of such dispersion or change to the discontinuous film is readily controlled in accordance with the intensity of the energy pulse above the aforementioned certain critical value to provide desired amounts of dispersion or change of the material to the discontinuous film, i.e., from no dispersion or change below the certain critical value to full dispersion or change and degrees of partial dispersion or change therebetween above the certain critical value.

The aforementioned considerations concerning the interfacial adhesion between the film of dispersion imaging material and the substrate, overcoat film and passivation layer, the solidification rate, the control of the edge roll back velocity and the amount of edge roll back of the material in its substantially fluid state, and the intensity of the applied energy above the certain critical value, jointly and severally constitute means associated with the film of dispersion imaging material for retarding the change to the discontinuous film, caused by the surface tension, and for controlling the amount of such change in accordance with the intensity of the applied energy above the certain critical value to increase the amount of said change and the area of the openings in the film and decrease the area of the deformed material in the film and, therefore, the optical density of the film in accordance with the intensity of the applied energy above said certain critical value for providing continuous tone or gray scale imaging of the dry process imaging film.

A passivating layer may be deposited on the substrate before the film of dispersion imaging film is deposited thereon and a passivating layer may be deposited on the film of dispersion imaging film before the overcoat is deposited thereon. The passivating layers operate effectively to prevent or limit oxidation of the film of dispersion imaging material and, hence, possible deterioration in the optical density of the film over a period of time. These passivating layers, as expressed above, also effect the interfacial adhesion between the substrate and the film and between the film and the overcoat.

The substrate of the high sensitivity imaging film may comprise a polyester material and the overcoat may comprise a polymer resin. The plurality of separate layers of the different and substantially insoluble components having relatively high melting points and relatively low melting point eutectics may comprise, for example, bismuth, tin, zinc, indium, lead, cadmium and the like. The passivating layers may comprise SiO, $SiO_2$, $Al_2O_3$, $GeO_2$, $TeO_2$, $SnO_2$, $Br_2O_3$ or the like.

The method of this invention for producing an image by a dry process with a minimum of the applied energy comprises the step of applying to the high sensitivity imaging film, discussed above, energy in an amount above the certain critical value sufficient to increase the absorbed energy in the film above the certain critical temperature value related to the relatively low melting points of the interfaces to disperse and change the substantially opaque film, where subject to the applied energy, to the discontinuous film comprising openings and deformed material which are frozen in place following said application of energy and through which openings light can pass for decreasing the optical density thereat. In the case of high contrast imaging, high gamma, the dispersion of the film from maximum optical density to minimum optical density is substantially instantaneous and complete. In the case of continuous tone or gray scale imaging, low gamma, the dispersion of the film is retarded and controlled in accordance with the intensity of the applied energy above said certain critical value.

The energy may comprise various forms of energy. The energy may comprise Joule heat energy applied to the film by means of, for example, direct electrical heating, electrically energized heating means, or the like, and absorbed in the film. The intensity of the applied Joule heat energy above the certain critical value may determine the amount of disperion or change of the film to the discontinuous film for continuous tone imaging, as discussed above. The heating means may include a single heating point which serially scans the film and which is intensity modulated, or it may comprise an advanceable matrix of heating points which are intensity modulated, for full format imaging of the film. In both cases continuous tone imaging may be obtained. The applied energy may also comprise a beam of radiant energy, such as, a laser beam of coherent energy or the like, which serially scans the film and which may be intensity modulated for determining the amount of dispersion or change to the discontinuous film and providing continuous tone or gray scale imaging.

This applied energy may also be noncoherent radiant energy, afforded by, for example, a Xenon lamp or flash bulb or the like, which is applied through an imaging mask which may have a full format continuous tone imaging pattern including portions of continuously differing transmissivity for the applied energy, to the substantially opaque film of dispersion imaging material substantially evenly in a full format pattern corresponding to the full format continuous tone imaging pattern of the imaging mask and having areas of different intensities of the applied energy above the certain critical value to provide at one time in the substantially opaque film of dispersion imaging material a stable finished full format image pattern of discontinuous film corresponding to the full format continuous tone pattern of the applied energy. In this instance the energy is preferably applied as a short pulse of said energy.

This latter manner of continuous tone or gray scale imaging is particularly applicable to and has great significance in several respects in the dry-process apparatus for producing archival microform records from light reflecting hard copy, as disclosed in the aforesaid sixth and seventh applications, wherein the light reflecting hard copy is microimaged as a transparency on an intermediate mask film and wherein the microimaged transparency of the mask film is reproduced on the film of dispersion imaging material by a short pulse of radiant or electro-magnetic energy.

The high sensitivity and high contrast film of dispersion imaging material of this invention, can be full format imaged with fine contrast and line resolution in the apparatus of said sixth and seventh applications when the hard copy is uniformly illuminated, the lens system is capable of reducing the image from the uniformly illuminated hard copy and applying the same to the intermediate mask film in a uniform manner with uniform contrast and line resolution, and the mask film is capable of producing a faithful reduced transparency of the uniformly illuminated hard copy with appropriate optical density and uniform contrast and line resolution. However, where the contrast and its uniformity in the mask film transparencies decreases, the line resolution thereof also decreases and the faithfulness of the reproduction of the image in the film of dispersion imaging material likewise decreases. A decrease in contrast and its uniformity, in addition to being caused by a reduction of the image, can also be caused by a sub-perfect illumination, by a sub-perfect lens system and by a sub-perfect intermediate mask film, any of which can cause an inferior image reproduction in the film of dispersion imaging material. In full format imaging various portions of the mask film transparency may have different amounts of contrast and optical density than other portions which also results in uneven imaging of the film of dispersion imaging material. In addition, non-uniformity of the flashing intensities over the full format area for the image transfer decreases the faithfulness of the reproduction in some of the cases.

Utilizing the high sensitivity and continuous tone imaging film of this invention in the apparatus of said sixth and seventh applications, obviates the aforementioned problems and provides latitude for such apparatus, allowing for greater tolerances in the lighting, lens system, intermediate mask film and flashing system thereof, to provide faithful reproduction of microimages of the hard copy in the continuous tone imaging film. The high sensitivity and continuous tone imaging film of this invention has a relatively low gamma with respect to the relatively high gamma of the high contrast films so as to be less affected by variations in contrast and optical density of the mask film and, hence, provide better line resolution in the film of dispersion imaging material, the former having the relatively low gamma providing wider latitude for the intensity of the short pulse of energy than the latter. The high sensitivity and continuous tone imaging film of this invention is also capable of accurately reproducing continuous tone images of the hard copy, such as, photographs or the like, as well as printed material, link drawings or the like.

Further objects of this invention reside in the construction of the high sensitivity dry process imaging film and in the cooperative relationships between the component parts thereof, and in the methods of making such an imaging film and of making an image utilizing such imaging film and in the cooperative relationships between the steps of said methods.

Other objects and advantages of this invention will become apparent to those skilled in the art upon reference to the accompanying specification, claims and drawings, in which:

Figure 2:
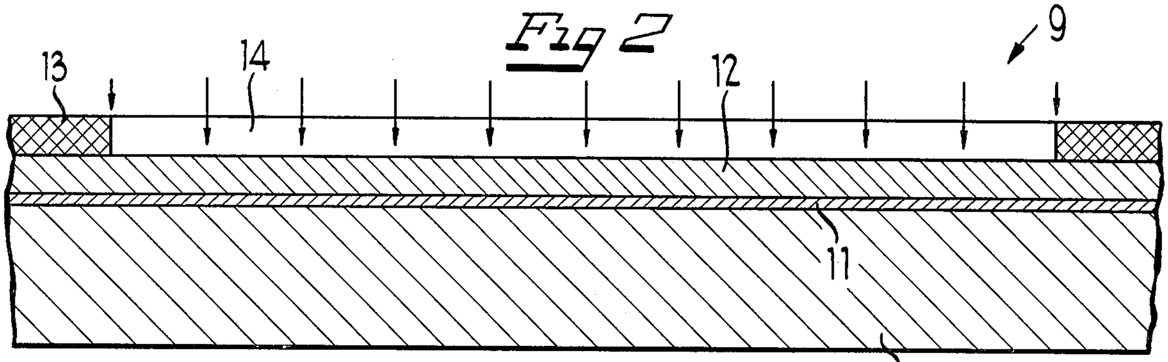
FIG. 2 is a greatly enlarged sectional and stylized view through either the high contrast or continuous tone imaging film of this invention and illustrating the imaging film before it is imaged.
Figure 6:
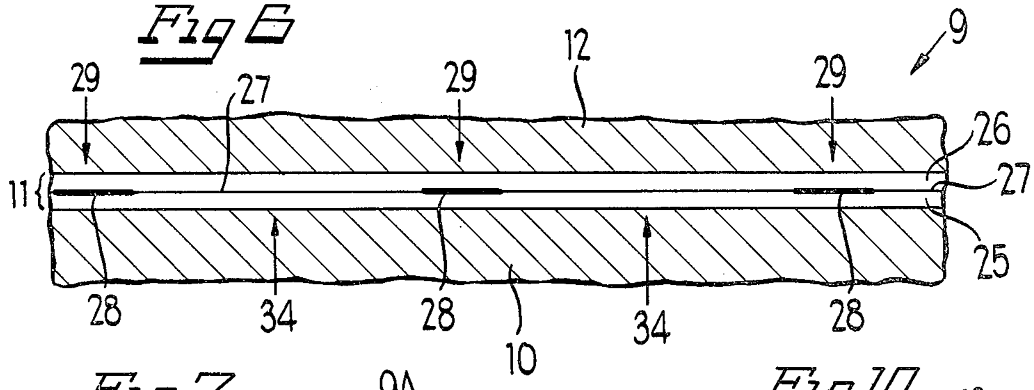
FIG. 6 is a further enlarged sectional and stylized view through one form of the instant invention where the film of dispersion imaging material includes a pair of separate layers of different and substantially insoluble components having relatively high melting points and relatively low melting point eutectics.

Referring first to FIGS. 2 and 6 one form of high sensitivity imaging film of this invention is generally designated at 9. It includes a substrate 10 which is preferably transparent and while it may be formed from substantially any substrate material, it is preferably formed from a polyester material, such as a polyethylene terephtalate, known as Melinex type O microfilm grade, manufactured and sold by ICI of America. The thickness of the substrate 10 is preferably in the range of about 4–7 mils.

Deposited on the substrate 10, as by vacuum deposition or the like, is a thin film of dispersion imaging material 11 which may comprise many different types of layers of materials as will be discussed below. The thickness of the film 11 of dispersion imaging material is such as to provide an optical density of about 1.0 to 2.5 in the completed imaging film depending upon the opacity desired. Generally, the thickness of the film 11 will run about 200 Å to about 1,500 Å. The nature of the thin film of dispersion imaging material 11 will be discussed in more detail below.

Deposited over the film 11 of dispersion imaging material is a substantially transparent overcoat film 12 having a thickness range of about 0.1 to 3 microns and preferably about 0.6 microns and preferably formed of a suitable polymer resin. The overcoat film 12 may comprise a polymer resin coating, for example, polyurethane estane No. 5715 as manufactured and sold by B. F. Goodrich Co., or silicone resin, Dow Corning R-4-3117 as manufactured and sold by Dow Corning Co., or polyvinylidine chloride (Suran) as manufactured and sold by Dow Chemical Co. For a formatted film, the overcoat film may comprise a photoresist material such as polyvinylcinnamate, for example, a Kodak KPR-4 photoresist manufactured and sold by Eastman-Kodak Co. which is negative working. The overcoat film may be applied by spin coating, roller coating, spraying, vacuum deposition or the like.

The imaging film including the substrate 10, the film 11 of dispersion imaging material and the polymer overcoat 12 may be imaged by energy, such as, for example, non-coherent radiant energy from a Xenon lamp or flashbulb or the like through an imaging mask 13 as illustrated in FIGS. 2–5. The imaging mask 13 can control the amount of non-coherent radiant energy passing therethrough and the amount of energy adsorbed in the film 11 of the dispersion imaging material and, therefore, can control the amount of dispersion of the dispersion imaging material 11 and the optical density thereof where imaged.

In accordance with this invention, as expressed above, dry process, high sensitivity imaging is provided, including high contrast imaging or continuous tone or gray scale imaging, depending upon the nature of the high sensitivity imaging film. In FIG. 2, the portion 14 of the imaging mask 13 has a sufficiently high optical density to limit the amount or intensity of the energy, as shown by the arrows, applied therethrough to the film 11 of dispersion imaging material, so that the absorbed energy in the material is not increased above the aforesaid certain critical value. As a result, the material is not changed to a substantially fluid state and the film 11 of dispersion imaging material remains in its solid, high optical density and substantially opaque condition. There are no openings in the imaging film 11 through which light can pass, the film being substantially opaque and having an optical density of substantially 1.0 to 1.5 or the like. This stage of imaging is applicable to both the high contrast and the continuous tone or gray scale imaging films.

Figure 3:
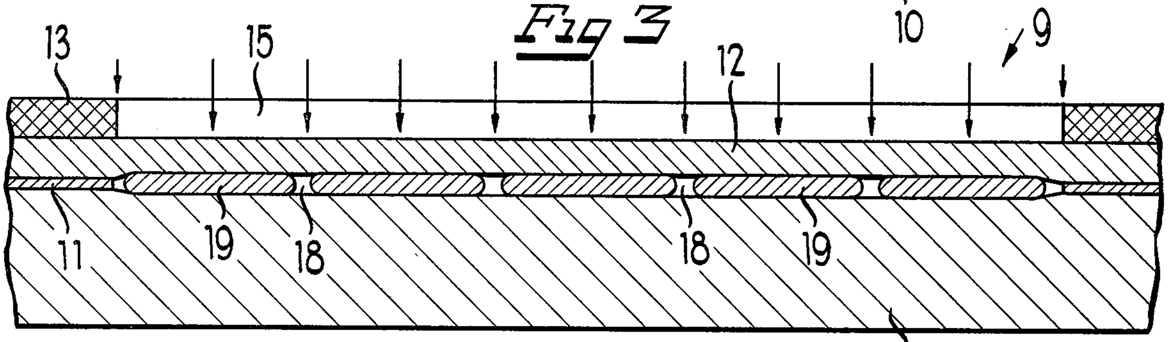
FIG. 3 is a sectional view similar to FIG. 2 illustrating the continuous tone imaging film when it is imaged by the application of relatively low energy above a critical value and having a relatively high optical density.

In FIG. 3, the portion 15 of the imaging mask 13 has a lower optical density to allow more radiant energy, as shown by the arrows, to pass through and be applied to the film 11 of dispersion imaging material. Here, the intensity of the applied energy is such that the absorbed energy in the film is just above the aforesaid certain critical value. The film 11 of dispersion imaging material is changed by such energy to a substantially fluid state in which the surface tension of the material causes the material to disperse and change to a discontinuous film having openings 18 and deformed material 19 which are frozen in place following said application of energy and through which openings 18 light can pass. In the case of the continuous tone or gray scale imaging, the dispersion imaging material is deformed only a small amount, as indicated at 19, to provide only small area openings 18 in the film 11, there being only a small amount of roll back of the deformed material 19 from the openings 18. The transmissivity of the film is low, but more than that of the substantially opaque undispersed film of FIGS. 2 and 6. Thus, the optical density of the film, where subject to such application of energy, is decreased a small amount. The area of the substantially opaque deformed material 19 is extremely large while the area of the openings 18 is extremely small.

Figure 4:
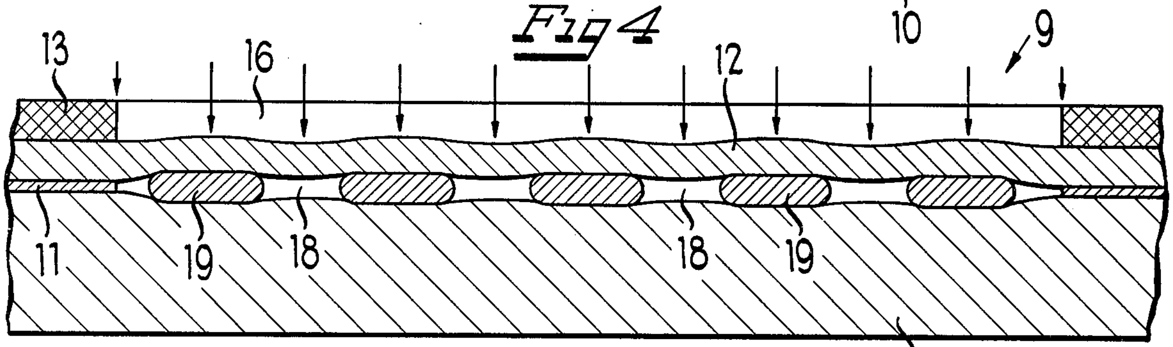
FIG. 4 is a sectional view similar to FIGS. 2 and 3 and illustrating the continuous tone imaging film when it has been subject to a greater amount of energy above the critical value and having a lower optical density.

In FIG. 4, the portion 16 of the imaging mask 13 has a lower optical density to allow still more radiant energy, as shown by the arrows, to pass therethrough and be applied to the film 11 of the dispersion imaging material. The intensity of the applied energy is such that the absorbed energy in the film is considerably above the aforesaid certain critical value. Because of the increased intensity of the applied energy, the dispersion imaging material is deformed a greater extent as indicated at 19 to provide large area openings 18 in the film 11, there being a larger amount of roll back of the deformed material 19 from the openings 18. The transmissivity of the film is thus increased, the optical density thereof decreased a greater amount.

Figure 5:
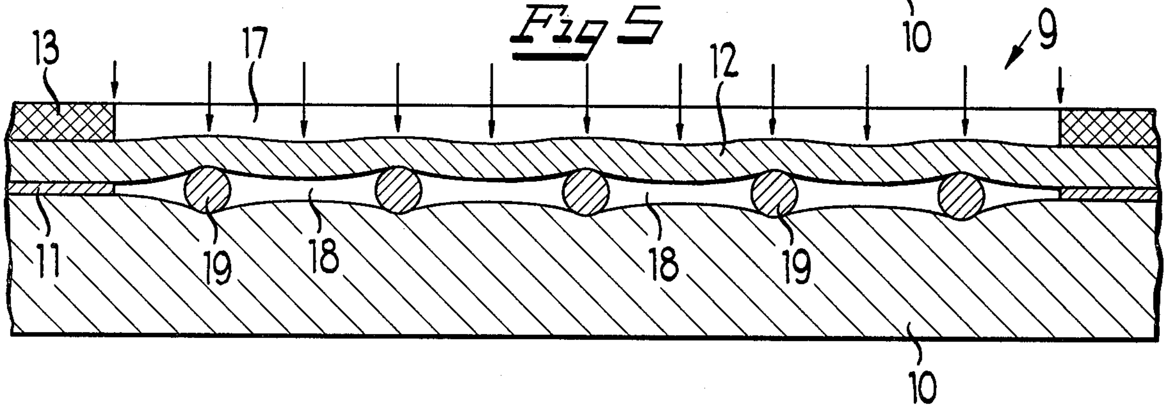
FIG. 5 is a sectional view similar to FIGS. 2, 3 and 4, and illustrating the continuous tone imaging film when subjected to a still greater amount of energy and the imaged high contrast film and having a minimum optical density.

In FIG. 5, the portion 17 of the imaging mask 13 has a still lesser optical density to allow still more radiant energy, as shown by the arrows, to pass therethrough and be applied to the film 11 of dispersion imaging material. Here, the intensity of the applied energy is such that the absorbed energy in the film is still more above the aforesaid certain critical value, substantially a maximum value. Because of this further increased intensity of the applied energy, the dispersion imaging material is deformed a greater extent to small spaced globules 19 and the openings 18 are increased to form substantially free space between the globules, there being a larger roll back of the deformed material 19 from the openings 18. The transmissivity of the film is thus increased to a maximum and the optical density thereof decreased to a minimum.

As distinguished from the continuous tone or gray scale imaging having the intermediate steps illustrated in FIGS. 3 and 4, in the high contrast imaging, upon the formation of the openings 18 and the deformed material 19, there is a substantial instantaneous and complete roll back of the imaging material to the discontinuous film condition illustrated in FIG. 5. Accordingly, the continuous tone or gray scale imaging utilizes an imaging film having a low gamma, while the high contrast imaging utilizes in imaging film having a high gamma.

As expressed above, this invention is principally directed to a high sensitivity imaging film requiring only a minimum amount of applied energy to change the imaging film from a solid high optical density film to a discontinuous film of lower optical density. In this respect, the film 11 of dispersion imaging material, deposited on the substrate 10 and provided with the overcoat film 12, comprises a plurality of separate layers of different and substantially mutually insoluble components having relatively high melting points and relatively low melting point eutectics and interfaces between said layers having relatively low melting points. In FIG. 6, two such separate layers of relatively high melting point components are illustrated at 25 and 26 with an interface 27 therebetween having relatively low melting points. In its simplest form, and to illustrate the nature of this invention, it is assumed that the layer 25 is bismuth (Bi) and that the layer 26 is tin (Sn), these metals having relatively high melting points and also having relatively low melting point eutectics. Bismuth has a melting point of substantially 271° C. and tin has a melting point of substantially 232° C. The eutectic of bismuth and tin ($Bi_{.43}$ and $Sn_{.57}$) has a melting point of substantially 139° C.

Figure 1:
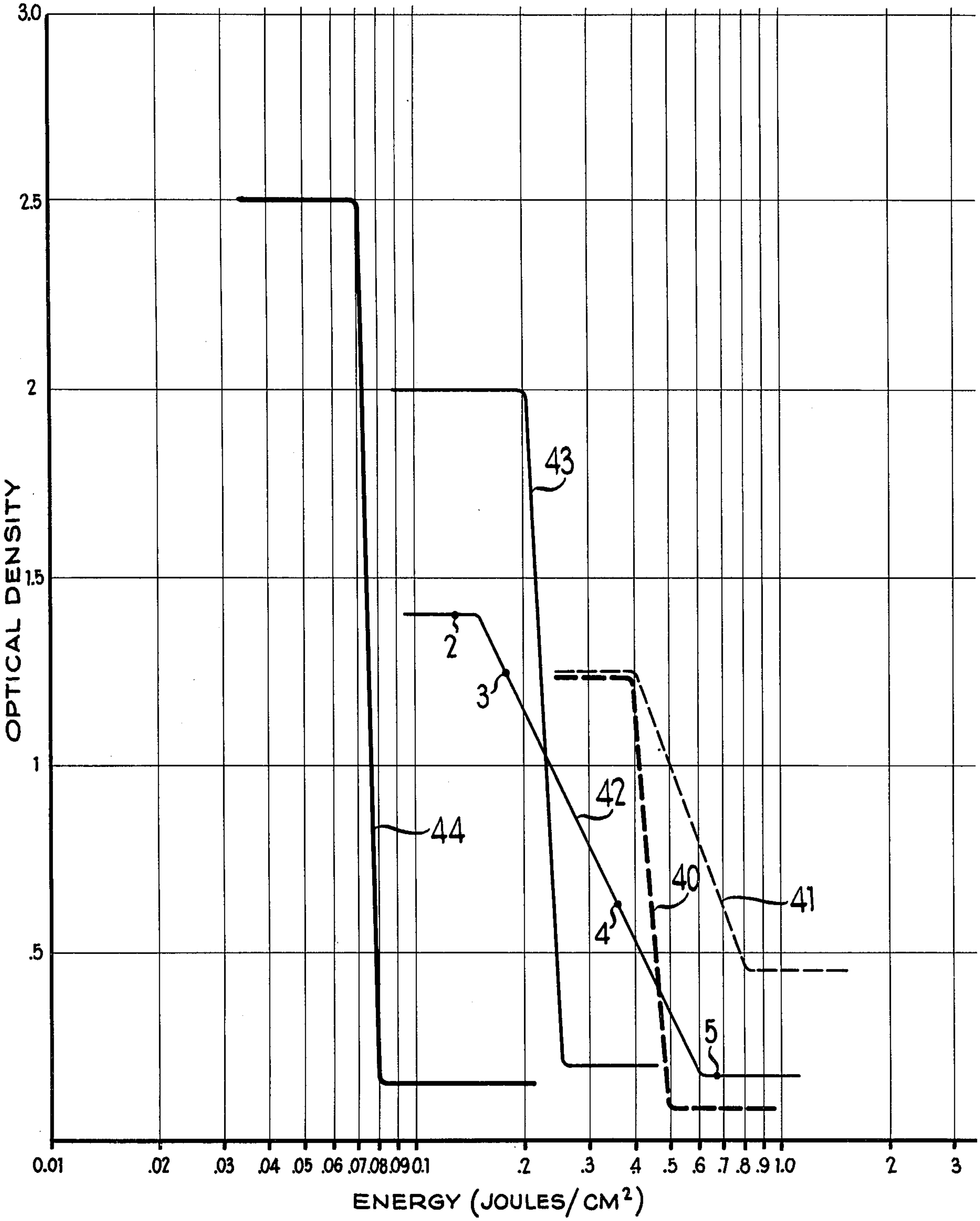
FIG. 1 is a semi-logarithmic and stylized graph plotting optical density vs. energy for a Xenon flash system using a pulse width of about 100 microseconds and illustrating the characteristics of some of the high sensitivity dispersion imaging films of this invention.

In connection with the explanation of this invention, when a layer of bismuth alone is deposited on the substrate 10 at a thickness to provide an optical density of about 1.25 (which is about 300 Å) and is covered with an overcoat film 12, the imaging characteristics of such a structure are illustrated by the curve 40 in FIG. 1. Curve 40 illustrates that such a structure utilizing the bismuth layer has an optical density in its unimaged state ($OD_{max}$) of about 1.25, a threshold voltage value ($E_{th}$) in Joules/cm$^2$ for beginning the imaging of about 0.4, a maximum energy value ($E_{max}$) for completing the dispersion of about 0.5 Joules/cm$^2$ and a minimum optical density ($OD_{min}$) of about 0.08 for maximum dispersion. This provides a relatively high gamma of about 8. Thus, the bismuth layer of this construction provides for a high contrast imaging, but it is here noted that a threshold energy value ($E_{th}$) to cause dispersion is substantially 0.4, with a maximum energy value ($E_{max}$) of substantially 0.5.

When a layer of tin is deposited on the substrate 10 to provide an optical density ($OD_{max}$) of about 1.25 (which may be a thickness of about 300 Å) and covered with an overcoat layer 12, the imaging characteristics of such structure are illustrated by curve 41 in FIG. 1. Here, the maximum optical density ($OD_{max}$) is substantially 1.25 and the energy threshold ($E_{th}$) is about 0.4. Here, there is some retarding and control of the roll back of the tin in its molten state and there is provided a minimum optical density ($OD_{min}$) of about 0.45 at a maximum energy value ($E_{max}$) of about 0.8. This structure with the layer of tin provides a relatively low gamma of about 2.7 which provides for continuous tone or gray scale imaging. It is believed that the interfacial adhesion between the layer of tin and the substrate 10 and overcoat 12 and/or the inclusion of solids or impurities in the layer of tin, such as oxides, incorporated therein during or after the deposition thereof, can operate to provide this relatively low gamma. Here, also, relatively high energies are required to cause the dispersion of the tin to the discontinuous film, requiring an $E_{th}$ of about 0.4 and an $E_{max}$ of about 0.8.

The curve 41 for the tin layer having the low gamma can be made to have a high gamma so as to approximate the high gamma of the curve 40 for the bismuth layer if the interfacial adhesion between the layer and the substrate and overcoat is changed, as by the use of passivation layers, and/or the solids or impurities, such as the oxides, are not incorporated in the layer. Likewise, the curve 41 for the bismuth layer having the high gamma can be made to have a low gamma so as to approximate the low gamma of the curve 41 for the tin layer if solids or impurities, such as oxides, are incorporated in the layer.

In the simple form of the invention, illustrated in FIG. 6 herein, a bismuth layer 25 is deposited on the substrate 10, a layer 26 of tin is deposited on the layer of bismuth and providing an interface 27 therebetween, and an overcoat 12 is deposited on the layer of tin 26. The layers 25 and 26 of bismuth and tin have solids or impurities therein, such as oxides, incorporated therein during or after the deposition thereof. The interface 27 between the layers 25 and 26 has a relatively low melting point which is related to the relatively low melting point eutectic of the bismuth and tin. The imaging characteristics of this simple construction are illustrated by the curve 42 in FIG. 1. Here, the thickness of the deposited bismuth layer 25 is substantially 150 Å, and the thickness of the tin layer deposited thereon is alos substantially 150 Å. These substantially equal thickness depositions of the bismuth and tin provide atomic percent ratios substantially equal to the eutectic of these metals ($Bi_{0.43}$ $Sn_{0.57}$). These depositions provide an $OD_{max}$ of about 1.40. The threshold energy value ($E_{th}$) of this construction is about 0.15, the $OD_{min}$ is about 0.18, and the applied energy $E_{max}$ for obtaining maximum dispersion is about 0.6. This provides a gamma of about 1.7 and, accordingly, provides a continous tone or gray scale imaging film. Thus, it is seen that the energy required to disperse the imaging film of this bismuth-tin layered construction is considerably less than the energy required to disperse the bismuth film and the tin film constructions, as discussed above. The bismuth-tin layered construction is, therefore, considerably more sensitive to the applied energy and comprises a high sensitivity imaging film.

The interface 27 between the layers 25 and 26, as expressed above, has a relatively low melting point related to the low melting point eutectic of the different components of the layers, as for example, about 139° C., the low melting point temperature of the eutectic ($Bi_{0.43}Sn_{0.57}$). This low melting point can be brought about by the mixing energy of the components at their interface or by the formation of an eutectic mixture of the components at their interface, which mixture can be microscopically thin. When the energy is applied to the film of dispersion imaging material in an amount sufficient to increase the absorbed energy in the film material above the certain critical value related to the relatively low melting point of the interface, the relatively low melting point interface 27 is melted and the substantially mutually insoluble components of the layers 25 and 26, bismuth and tin, are incorporated into the molten interface for changing the film to the substantially fluid state. In this connection, it is believed that the component layers are broken up and that at least some of the components are dissolved into the molten interface in accordance with the eutectic ratio of the components and the temperatures involved.

The oxides in the layers 25 and 26 form solids or impurities therein which may not be dissolved into the molten material and which may remain solid and operate to retard the roll back of the imaging film in its substantially fluid state. This can be a factor in providing continuous tone or gray scale imaging. Also, in the event that the ratio of the components of the layers is substantially off the eutectic, the excess component may not be fully dissolved in the molten material and may remain solid and operate to retard the roll back of the imaging film in its substantially fluid state. This can also be a factor in providing continuous tone or gray scale imaging.

The components of the separate layers 25 and 26, bismuth and tin, and crystalline and can have different grain structures and, therefore, provide an uneven interface structure so that the interface 27 between the layers can have different regions with more or less mixing of the components with the result that the regions of greater mixing can melt at lower temperatures and sonner than the other regions. Such interface regions are diagrammatically indicated by heavy lines at 28 in FIG. 6. When the dispersion imaging material 11 disperses and changes to the discontinuous film, as discussed above in connection with FIGS. 2 to 5, the openings 18 can usually begin to form at at least some of the regions 28, as indicated at 29 in FIG. 6, and the deformed material 19 can roll back toward roll back points, as indicated at 34, the roll back points 34 forming nucleation points for the dispersion of the imaging material 11 to the discontinuous film. The oxides in the layers 25 and 26 also preferentially form at the grain boundaries of the bismuth and tin in the layers and also can have an effect upon the points where the openings 18 begin to form and, hence, upon the roll back or nucleation points 34.

The roll back or nucleation points 34 can also be afforded by the uneveness of the substrate 10, upon which the film of dispersion imaging material 11 is deposited or upon the uneveness of the film of dispersion imaging material 11 upon which the overcoat film 12 is deposited, and by the interfacial adhesion between the substrate and the film of imaging material or the interfacial adhesion between the film of imaging material and the overcoat film.

While the aforementioned two layered imaging film utilizing deposited separate layers of bismuth and tin in substantially stochiometric amounts provides a relatively low gamma and, hence, continuous tone or gray scale imaging, it is believed that this is due to the solids or impurities, such as the oxides, in the layers 25 and 26 and/or the interfacial adhesion between the layers 25 and 26 and the substrate 10 and overcoat film 12. In Curve 42 for the bismuth-tin layered construction, points 2, 3, 4 and 5 thereof correspond generally to the amount of dispersion illustrated, respectively, in FIGS. 2, 3, 4 and 5. On the other hand, if the solids or impurities, such as the oxides, are not incorporated in the layers 25 and 26 and/or the interfacial adhesion between the layers 25 and 26 and the substrate 10 and overcoat 12 is changed, as by the use of passivation layers, relatively high gamma can be provided and the dispersion can follow more closely the slope of that of curve 40 in FIG. 1 to provide high sensitivity, high contrast imaging as distinguished from high sensitivity continuous tone or gray scale imaging.

Figure 7:
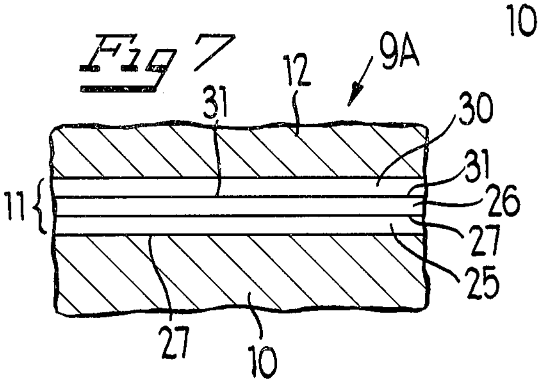
FIG. 7 is a view similar to FIG. 6 but illustrating three separate layers of the different and substantially insoluble components.
Figure 8:
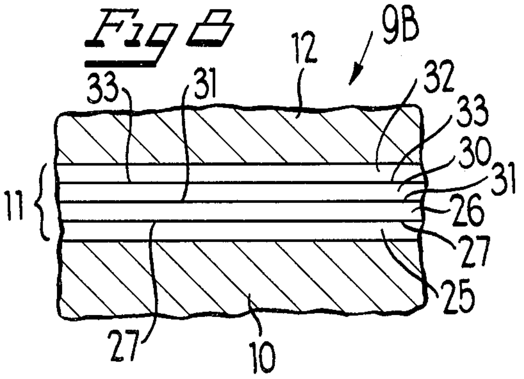
FIG. 8 is a view similar to FIGS. 6 and 7 but illustrating four separate layers of the different and substantially insoluble components.

In accordance with this invention, the dry process, high sensitivity imaging film may comprise additional separate layers of different and substantially mutually insoluble components over and above the two separate layers 25 and 26 illustrated in FIG. 6. In this respect, a further form of the invention is generally designated at 9A in FIG. 7, where, in addition to the separate layers 25 and 26 with the interface 27 therebetween, an additional component layer 30 is deposited over the component layer 26 and having an interface 31 therebetween. In FIG. 8 a further form of the invention is generally designated at 9B, where an additional component layer 32 is deposited over the layer 30 and has an interface 33 between said layers. In other words, the high sensitivity imaging film 9A is a three-layer film and the high sensitivity imaging film 9B is a four layer film. Of course, additional layers 30 and 32 operate in substantially the same manner as described above in connection with the interface 27 between the layers 25 and 26.

The separate layers 25, 26, 30 and 32 are formed of different and substantially mutually insoluble components having relatively high melting points and relatively low melting point eutectics, and interfaces 27, 31 and 33 therebetween having relatively low melting points related to the melting point eutectics of the adjacent layers. Some of the layers may consist of the same components if desired.

Examples of some pure metals for the plurality of separate layers and the eutectic compositions (Atomic Fractions) thereof and their melting points are as follows:

| | | | |
|---|---|---|---|
| In | (156° C.) | $Bi_{.22}In_{.78}$ | (72° C.) |
| Sn | (232° C.) | $In_{.53}Sn_{.47}$ | (117° C.) |
| Bi | (271° C.) | $Bi_{.43}Sn_{.57}$ | (139° C.) |
| Zn | (420° C.) | $In_{.95}Zn_{.05}$ | (144° C.) |
| | | $Sn_{.85}Zn_{.15}$ | (198° C.) |
| | | $Bi_{.92}Zn_{.08}$ | (269° C.) |

Examples of the imaging characteristics of films deposited on a polyester substrate with a polymer overcoat deposited thereon are tabulated below. In this tabulation, the description of the films includes the order of deposition of the separate layers and the atomic fractions or percent of the different components respectively contained in the layers. The tabulation sets forth for each of the films the approximate gamma (γ), maximum optical density ($OD_{max}$), threshold energy ($E_{th}$), minimum optical density ($OD_{min}$) and maximum energy ($E_{max}$), all of which can be related to the graph coordinates of FIG. 1.

| | Individual Components | | | | |
|---|---|---|---|---|---|
| Film | γ | $OD_{max}$ | $E_{th}$ | $OD_{min}$ | $E_{max}$ |
| Bi | 8 | 1.25 | .4 | .08 | .5 |
| Sn | 2.7 | 1.25 | .4 | .45 | .8 |
| Zn | 15 | 1.25 | .7 | .17 | .8 |
| In | 4.5 | 1.25 | .6 | .45 | 1.0 |

| | Multiple Layers (2, 3 and 4 Layers) | | | | |
|---|---|---|---|---|---|
| Film | γ | $OD_{max}$ | $E_{th}$ | $OD_{min}$ | $E_{max}$ |
| $Bi_{.43}Sn_{.57}$ | 1.7 | 1.40 | .15 | .18 | .6 |
| $Bi_{.50}In_{.50}$ | 4 | 1.25 | .25 | .1 | .5 |
| $Bi_{.55}Pb_{.45}$ | 15 | 1.25 | .2 | .22 | .22 |
| $Cd_{.38}Sn_{.62}$ | 4 | 1.25 | .5 | .24 | 1.05 |

-continued

| | Multiple Layers (2, 3 and 4 Layers) | | | | |
|---|---|---|---|---|---|
| Film | γ | $OD_{max}$ | $E_{th}$ | $OD_{min}$ | $E_{max}$ |
| $Pb_{.20}Sn_{.80}$ | 3.5 | 1.25 | .5 | .15 | 1.0 |
| $Zn_{.15}Sn_{.85}$ | 1.7 | 1.25 | .25 | .25 | 1.3 |
| $Zn_{.09}Bi_{.40}Sn_{.51}$ | 3 | 1.25 | .2 | .18 | .4 |
| $Cd_{.27}Bi_{.40}Sn_{.33}$ | 2.5 | 1.25 | .2 | .18 | .4 |
| $Zn_{.10}(In_{.53}Sn_{.47})_{.90}$ | 2 | 1.25 | .4 | .2 | 1.3 |
| $Bi_{.40}(In_{.53}Sn_{.47})_{.60}$ | 2.2 | 1.25 | .3 | .2 | .8 |
| $Bi_{.20}Sn_{.40}In_{.40}$ | 3.7 | 1.25 | .2 | .15 | .4 |
| $Pb_{.17}Bi_{.52}Sn_{.31}$ | 10 | 2.0 | .15 | .3 | .25 |
| $Zn_{.10}Bi_{.40}In_{.20}Sn_{.30}$ | 5 | 1.25 | .2 | .17 | .35 |
| $Zn_{.10}Bi_{.40}(In_{.53}Sn_{.47})_{.50}$ | 2.2 | 1.25 | .3 | .2 | .8 |
| $Zn_{.15}In_{.15}Bi_{.15}Sn_{.55}$ | 2.5 | 1.25 | .3 | .2 | .8 |

The foregoing tabulation of specific examples graphically illustrates the wide variety of separate layers of different and substantially insoluble components having relatively high melting points and relatively low melting point eutectics and the various numbers of separate layers which may be utilized in providing the dry process high sensitivity imaging film of this invention. In the tabulation, the gamma (γ) and the maximum energy ($E_{max}$) can be varied, substantially as desired, by controlling the presence and amounts of solids or impurities, such as oxides, in the films and/or by controlling the interfacial adhesion between the films and their substrates and overcoats. Those with a relatively high gamma can be considered to provide high constrast imaging while those with a relatively low gamma can be considered to provide continuous tone or gray scale imaging.

The high sensitivity imaging films of this invention preferably include passivating layers for stabilizing the film over a period of time as to its optical density and its sensitivity by preventing or reducing oxidation of the film of dispersion imaging material over a period of time. A passivating layer is first deposited on the substrate before the layers of the film of dispersion imaging material are deposited thereon, and then a passivating layer is deposited on the deposited film of dispersion imaging material before the overcoat film is deposited thereon. This is illustrated by the imaging film 9C, 9D and 9E in FIGS. 9 to 11 which correspond respectively to the imaging films 9, 9A, and 9B of FIGS. 6 to 8 but which have a passivating layer 35 deposited on the substrate 10 and a passivating layer 36 deposited on the film of dispersion imaging material 11. Like reference characters are utilized for like elements in FIGS. 6 to 8 and in FIGS. 9 to 11.

The passivating layers 35 and 36 may be formed of a number of different materials, as for example, silicon monoxide (SiO), silicon dioxide ($SiO_2$), aluminum oxide ($Al_2O_3$), germanium oxide ($GeO_2$) or the like. The passivating layers 35 and 36 also have an effect upon the solid state interfacial adhesions between the substrate 10 and the film 11 deposited thereon and the overcoat film 12 deposited on the film 11. Generally speaking, poor solid state adhesion provides higher sensitivity while good solid state adhesion provides lower sensitivity. Also, generally, SiO and $SiO_2$ provide relatively poor solid state adhesion while $Al_2O_3$ and $GeO_2$ provide relatively good solid state adhesion, but there is a dependency upon the components of the film layers interfacing with the passivating layers.

It is possible that the interfacial adhesion between the passivating layers and the dispersion imaging material in its substantially fluid state follows the solid state adhesion between the passivating layers and the dispersion imaging material in its solid state and has a relation with the surface tension of the dispersion imaging material in its substantially fluid state. It is also possible that good solid state interfacial adhesion slows down the melting of the dispersion imaging material due to good thermal contact or mechanical stress breakup considerations. These considerations can be factors in determining whether the imaging of the high sensitivity films is high contrast imaging or continuous tone or gray scale imaging.

Figure 9:
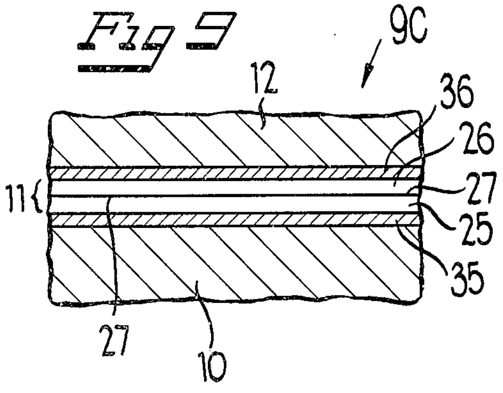

As a specific example of one form of dry process high sensitivity imaging film of this invention utilizing passivating layers, reference is made to FIG. 9. Here, a passivating layer 35 of $GeO_2$ is first deposited on a polyester substrate 10 having a thickness of about 4 mils. The $GeO_2$ passivating layer 35 is deposited to a thickness of about 150 Å. A layer 25 of bismuth is then deposited on the passivating layer 35 to a thickness of about 250 Å. Then a layer 26 of tin is deposited on the bismuth layer 25 to a thickness of about 250 Å and providing an interface 27 therebetween. Thereafter, a passivating layer 36 of SiO is deposited on the tin layer 26 to a thickness of about 150 Å. The amounts of bismuth and tin in the layers 25 and 26 correspond generally to the eutectic fractions thereof. A polymer overcoat 12 of a thickness about 6000 Å is deposited over the passivating layer 36. Here, substantially no solids or impurities, such as oxides, are present in the layers 25 and 26 and the passivating layers 35 and 36 prevent or limit the amount of oxidation of said layers through the substrate 10 or the overcoat 12. This high sensitivity imaging film has a gamma of about 18, a maximum optical density of about 2, a threshold energy value of about 0.2, a minimum optical density of about 0.2 and a maximum energy value of about 0.25. The imaging characteristics of this particular high sensitivity imaging film are illustrated by the curve 43 in FIG. 1. This particular imaging film has a gamma of about 18 for a high contrast film and it is considerably more sensitive than films made only of bismuth as indicated by the curve 40 in FIG. 1 or of tin as indicated by the curve 41 in FIG. 1. Here it is believed that the interfacial adhesion between the bismuth layer 25 and the $GeO_2$ passivating layer 35 is good while the interfacial adhesion between the tin layer 26 and the SiO passivating layer 36 is poor. As a result of the lack of oxides in the layers 25 and 26 and/or the interfacial adhesion between the imaging layers 25 and 26 and the passivating layers 35 and 36, a high gamma or high contrast film is provided. If, however, oxides are included in the layers 25 and 26, a low gamma film may be provided so that the slope of curve 43 in FIG. 1 may approximate the slope of the curve 42.

Figure 10:
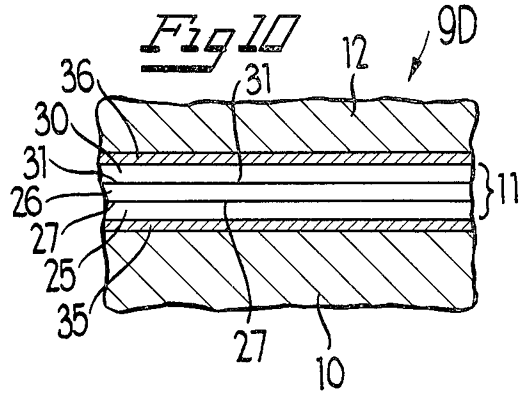
FIGS. 9, 10 and 11 are views respectively showing the forms of the inventions illustrated in FIGS. 6, 7 and 8 but illustrating the inclusion of passivating layers between the substrate, the dispersion imaging material and the overcoat film.
Figure 11:
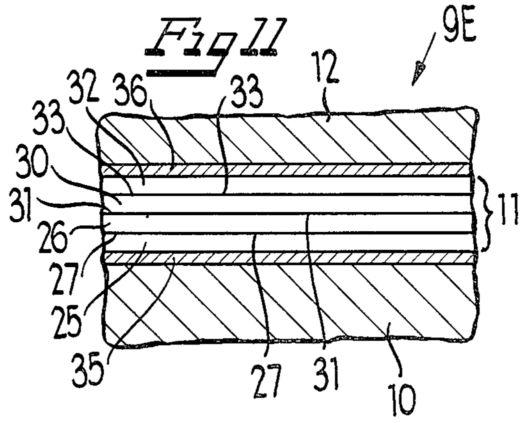

As another example of the dry process high sensitivity imaging film of this invention utilizing passivating layers, reference is made to FIG. 10. Here a passivating layer 35 of $Al_2O_3$ is deposited upon the polyester substrate 10, having a thickness of about 4 mils. The $Al_2O_3$ passivating layer 35 has a thickness of about 150 Å. Deposited upon the passivating layer 35 is a bismuth layer 25 having a thickness of about 100 Å. Deposited on the bismuth layer 25 is a layer 26 of tin, having a thickness of about 200 Å. Deposited on the tin layer 26 is a layer 30 of bismuth having a thickness of about 100 Å. The layers 25, 26 and 30 have interfaces 27 and 31 therebetween. The amounts of bismuth, tin and bismuth in the layers 25, 26 and 30 correspond substantially to the eutectics of bismuth and tin. Deposited on the bismuth layer 32 is a passivating layer 36 of SiO, having a thickness of about 400 Å. Deposited over the passivating layer 36 is a polymer resin film having a thickness of about 2000 Å. There are substantially no solids or impurities, such as oxides, in the layers 25, 26 and 30.

The imaging characteristics of this particular high sensitivity imaging film are illustrated by the curve 44 in FIG. 1. It has a gamma of about 30, a maximum optical density of about 2.5, a threshold energy value of about 0.07, a minimum optical density of about 0.15 and a maximum energy value of about 0.08. It is thus seen that this particular high sensitivity imaging film is a high contrast film and that it is extremely sensitive, having an energy value considerably less than those of the curves 40, 41, 42 and 43 of FIG. 1. It is believed that the interfacial adhesion between the bismuth and the SiO is poor, and that the interfacial adhesion between the bismuth and the $Al_2O_3$ is fair, and this, along with the lack of oxides in the layers 25, 26 and 30, probably is a factor which accounts for the extremely high sensitivity and high contrast imaging of this particular film. Also, here the thickness of the polymer overcoat 12 (about 2000 Å) is thin and operates in conjunction with the SiO passivating layer 36 (about 400 Å) to provide a substantially non-reflective overcoating for the film. It is believed that this particular relationship operates to boost still further the sensitivity of the imaging film. By incorporating oxides in the layers 25, 26 and 30 of this film, the gamma of the film can be decreased to provide continuous tone or gray scale imaging.

As a further example of a dry process high sensitivity imaging film of this invention utilizing passivating layers, reference is again made to FIG. 9. Here, a passivating layer 35 of SiO is deposited on the polyester substrate 10 having a thickness of about 4 mils. The passivating layer 35 has a thickness of about 150 Å. Deposited on the SiO passivating layer 35 is a layer of tin having a thickness of about 100 Å. Deposited on the tin layer 25 is a layer 26 of bismuth having a thickness of about 150 Å and providing an interface 27 therebetween. Deposited on the bismuth layer 26 is a passivating layer 36 of SiO having a thickness of about 150 Å. Deposited over the passivating layer 36 is a polymer overcoat film 12 having a thickness of about 6000 Å. This particular high sensitivity imaging film has a gamma of about 2.5, a maximum optical density of about 1.3, a threshold energy value of about 0.15, a minimum optical density of about 0.20, and a maximum energy value of about 0.4. It is thus seen that this particular high sensitivity imaging film, having the low melting point interface, is considerably more sensitive than the sensitivity of the separate layers making up the film and the gamma of the film is low to provide continuous tone or gray scale imaging. Here, it is believed that the interfacial adhesion between the passivating layers and the tin and bismuth layers is poor, which can also be a factor in providing high sensitivity. However, here, the amounts of tin and bismuth in the respective layers 25 and 26 are considerably off the eutectic of these metals and this may be a factor resulting in the continuous tone or gray scale imaging accomplished by this film, the excess of bismuth probably remaining solid and retarding the roll back of the substantially fluid imaging material.

Figure 12:
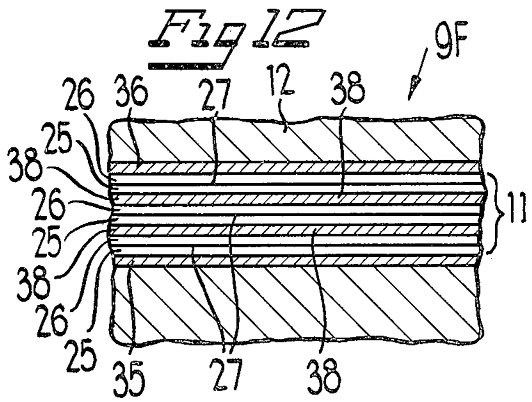
FIG. 12 is an illustration similar to FIGS. 6–11 but illustrating layers of solid materials interposed between sets of the separate layers of different and substantially insoluble components having relatively high melting points and relatively low melting point eutectics.

Still another example of a dry process high sensitivity imaging film of this invention, utilizing passivating layers and providing continuous tone or gray scale imaging, is illustrated in FIG. 12. Here, the film of dispersion imaging material 11 comprises a plurality of sets of separate layers 25 and 26 of different and substantially insoluble components having relatively high melting points and relatively low melting point eutectics, and interfaces 27 therebetween, having relatively low melting points. Layers of solid material 38 are deposited between the sets of layers 25 and 26. A passivating layer 35 is deposited on the substrate 10, and a passivating layer 36 is deposited on the film of dispersion imaging material 11 before the overcoat film 12 is deposited thereon.

More specifically, FIG. 12 can comprise a passivating layer 35 of $GeO_2$ deposited on the polyester substrate 10 having a thickness of about 4 mils. The passivating layer 35 may have a thickness of about 150 Å. Deposited on the passivating layer 35 is a bismuth layer 25 having a thickness of about 40 Å and deposited on the layer 25 is a tin layer 26 having a thickness of about 40 Å and providing an interface 27 therebetween. Deposited on the tin layer 26 is a layer of $GeO_2$ having a thickness of about 30 Å. Additional layers 25 of bismuth and 26 of tin, 38 of $GeO_2$, and 25 of bismuth and 26 of tin are deposited thereon, having substantially the same thicknesses as in the first set of layers. A passivating layer 36 of $GeO_2$, having a thickness of about 150 Å is deposited on the film 11 and a polymer overcoat film 12 is deposited on the passivating layer 36 and has a thickness of about 6000 Å.

Such a construction provides a gamma of 1.7, a maximum optical density of about 1.0, a threshold energy value of about 0.25, a minimum optical density of about 0.16, and a maximum energy value of about 0.7. Thus, the film of FIG. 12 is a high sensitivity film and since it has a gamma of about 1.7, it provides continuous tone or gray scale imaging. These imaging characteristics correspond generally to the imaging characteristics of the curve 42 in FIG. 1.

The substantially equal thicknesses of the bismuth and tin layers 25 and 26 provide substantially eutectic amounts of bismuth and tin. The interfacial adhesion between the bottom bismuth layer 25 and the $GeO_2$ passivating layer 35 and between the top tin layer 25 and the $GeO_2$ passivating layer 36 are both good, and this can be a factor in providing the low gamma and the continuous tone or gray scale imaging. The intermediate $GeO_2$ layers 38, which are solid and which must be broken up during the melting of the bismuth and tin layers and carried along with the molten material, operates to retard the roll back of the material in its molten condition. This can be another factor in providing the relatively low gamma and the continuous tone or gray scale imaging.

The various layers of the dispersion imaging material and also the passivating layers may be deposited on the substrate in various ways, as for example, among others, by vacuum deposition, including resistance heating or electron beam deposition or the like.

In the case of resistance heating vacuum deposition, a vacuum chamber may be utilized and may have a copper substage holder for holding the substrate of the film. Located below the film substrate held by the copper substage is a plurality of resistance heated boats made of tungsten, molybdenum, tantalum or the like, depending upon the materials to be evaporated therefrom. These resistance heated boats are arranged side by side in close proximity and about 6 to 9 inches below the film substrate. A clean glass chimney is preferably arranged between the film substrate and the boats in the deposition system to prevent contamination of the rest of the system by the materials evaporated from the boats. The copper substage is preferably maintained at about room temperature. The materials to be evaporated are separately placed in the different resistance heated boats, as for example, bismuth, tin and the like, and also the materials for the passivating layers, if utilized.

The vacuum in the vacuum chamber is pulled down to about 1 to $5\times10^{-6}$Torr, which operates first to outgas the polyester substrate held by the copper substage. The layers of the components forming the layered dispersion imaging material and the passivating layers, if utilized, are deposited successively on the substrate to desired thicknesses from the different resistance heated boats by successively heating the same to vapor deposition temperatures. The depositions of the various layers are done without breaking the vacuum in the vacuum chamber. The completed film is then removed from the vacuum chamber and immediately coated with the polymer overcoat as by spin coating, roller coating, spraying or the like. The vacuum deposition of the various layers are controlled to provide desired layer thickness. Since no oxygen is introduced into the vacuum chamber during deposition, substantially no oxides are introduced into the imaging film so as to provide a high contrast high sensitivity film.

The depositions of the layers by the electron beam vacuum deposition procedure may be done in a continuous web process. This process utilizes a vacuum chamber having therein a web payoff spool, a water cooled drum and a web takeup spool with the polyester substrate coursing the same. A web position idler is preferably arranged between the water cooled drum and the web takeup spool. The system also includes a multiple boat turret electron beam gun wherein the multiple boats respectively have different materials therein to be evaporated by the electron beam gun. The turret electron beam gun is arranged below the water cooled drum at a distance of about 10 inches. The multiple boats in the turret are selectively moved with respect to the electron beam gun so that the materials in the boats may be selectively evaporated by the electron beam and deposited on the substrate as it is passed over the water cooled drum. The system also includes a crystal rate controller which electronically controls the deposition power of the electron beam gun. The system may further include an optical monitor for monitoring the depositions of the respective layer materials on the substrate as to optical density.

As an example, for producing the high sensitivity imaging film whose imaging characteristics are illustrated by the curve 43 in FIG. 1, the following procedure may be utilized. The vacuum chamber is pulled down to less than about $5\times10^{-5}$Torr and the substrate is paid off the payoff spool over the water cooled drum to the takeup spool, and reversed back onto the payoff spool at a speed of about 3 ft/min for the purpose of first outgassing the polyester substrate. The substrate is then advanced from the payoff spool and has deposited thereon a first passivation layer of about 150 Å of $GeO_2$ deposited from one of the turret boats by the electron beam at a rate of about 20 Å/sec and a web speed of about 3 ft/min. The deposition rate is controlled by using the crystal rate controller which electronically controls the deposition power of the electron beam gun. The coated substrate is then returned to the web payoff spool for the next deposition step. A 250 Å layer of bismuth is then deposited on the coated substrate, as it is again advanced, from another of the turret boats by the electron beam at a rate of about 70 Å/sec, with a web speed of about 6 ft/min. The deposition rate is again controlled by the crystal rate controller, and the optical density of the film is monitored by the optical monitor during the run. In a similar fashion, a 250 Å layer of tin is deposited from another turret boat over the bismuth layer, followed by a 150 Å layer of SiO from still another turret boat. The web is then removed from the vacuum chamber and is roller coated with a polymer overcoat having a thickness of about 6000 Å. Care is taken in the payoff and takeup spools, both during evaporation depositions and polymer coating, to control the web tension to avoid scratching, telescoping and so forth of the imaging film. Since no oxygen is introduced into the vacuum chamber during deposition, substantially no oxides are introduced into the imaging film so as to provide a high contrast, high sensitivity film.

Another vacuum deposition procedure for depositing the layers in a continuous web process may also be utilized, as for example, for depositing the bismuth and tin layers in sequence during a single pass of the web. Here, the deposition apparatus may include the same apparatus described immediately above. It may also utilize a resistance heated boat arranged laterally and upwardly from the turret boats of the electron beam gun toward the payoff spool side. The resistance heated boat is located about 6 inches below the water cooled drum and a baffle extending below and upwardly along the side of the resistance heated boat operates to guide the deposition streams from the resistance heated boat and from the turret electron beam gun onto the web coursing the water cooled drum. In this respect, the deposition stream from the resistance heated boat, for example, bismuth, is first deposited on the web and then the deposition stream from the turret electron beam gun, for example, tin, is next deposited, with some intermixing or overlapping of the deposition streams depending upon the guiding action of the baffle. By raising the baffle the intermixing or overlapping is decreased and by lowering it the mixing or overlapping is increased and, thus, the structure of the interface between the layers may be controlled as to the amount of eutectic mixture therein and the gradation thereof.

A specific example of this last mentioned vacuum deposition procedure comprises pulling down the vacuum chamber to less than about $5\times10^{-5}$Torr and paying the substrate off the payoff spool over the water cooled drum to the takeup spool, and reversing the substrate back onto the payoff spool at a speed of about 3 ft/min for the purpose of outgassing the substrate. The substrate is then advanced from the payoff spool and has deposited thereon a first passivation layer of about 150 Å of $GeO_2$ deposited from one of the turret boats by the electron beam at a rate of about 20 Å/sec and a web speed of about 3 ft/min. The deposition rate is controlled by using the crystal rate controller which electronically controls the deposition power of the electron beam gun. The coated substrate is then returned to the web payoff spool for the next deposition step. Oxygen is then bled into the vacuum chamber through a needle valve while pumping a vacuum to establish a dynamic steady state pressure of $O_2$ in the system. A pressure of about 1 to $2\times10^{-4}$Torr of $O_2$ is maintained and the coated substrate is advanced from the payoff spool at a speed of about 1 to 3 ft/min. The resistance heated boat is energized to deposit bismuth onto the coated substrate to an optical density of about 0.7 when the coated substrate is moved at the aforementioned speed. The deposition of the tin from another boat of the turret electron beam gun is made at a rate adjusted to give a total optical density to the film of about 1.4. Thus, bismuth is first deposited on the coated substrate followed by the sequential deposition of tin thereover to provide layers of bismuth and tin with a mixture thereof therebetween to a total thickness of about 250 Å providing a total optical density of about 1.4. The tin deposition rate was typically about 40 to 60 Å/sec.

Following this sequential deposition of bismuth and tin, the coated substrate with the bismuth and tin sequentially deposited thereon is returned from the takeup spool to the payoff spool and the flow of $O_2$ into the vacuum chamber is stopped and the residual oxygen pressure is evacuated. Thereafter, the film is advanced from the payoff spool to the takeup spool and a passivation layer of $GeO_2$ is deposited thereover from the first boat in the turret electron beam gun to a thickness of about 150 Å. The web is then removed from the vacuum chamber and is roller coated with a polymer overcoat having a thickness of about 6,000 Å. Care is taken in the payoff and takeup spools, both during evaporation depositions and polymer coating to control the web tension to avoid scratching, telescoping and so forth of the imaging film.

The introduction of oxygen into the vacuum chamber during the sequential desposition of the bismuth and tin produces oxides therein which operate to provide a continuous tone or gray scale imaging film having relatively low gamma corresponding generally to the curve 42 in FIG. 1. By controlling the amount of oxygen fed into the vacuum chamber during the sequential deposition of the bismuth and tin, the gamma of the imaging film may be controlled, the more the oxygen introduced into the vacuum chamber, the more are the oxides incorporated in the film and the lower the gamma of the film. If no oxygen is bled into the vacuum chamber during the deposition of the bismuth and the tin, the imaging film produced will be a high contrast, high sensitivity film such as illustrated by the curve 43 in FIG. 1.

Similarly, if oxygen is fed into the resistance heating vacuum deposition procedure discussed above, or into the continuous web vacuum deposition procedure also discussed above, the imaging films can be continuous tone or gary scale imaging films having a low gamma because of the oxides introduced into the films during the depositions thereof. Here, also the amount of oxygen bled into the vacuum chamber can control the oxides contained in the films and hence the gamma of the films.

While specific reference has been made with respect to FIGS. 2 to 5 to the use of an imaging mask 13 and noncoherent radiant energy to increase the absorbed energy in the film 11 of dispersion imaging material above the certain critical value for changing the same to the fluid state, other forms of energy and manners of application may be utilized for this purpose within the scope of this invention. The applied energy may also comprise a beam of radiant energy, such as, a laser beam of coherent energy, which serially scans the film and which is intensity modulated. Laser beam imaging on a film is somewhat inefficient, it requires high powered and expensive laser equipment and is not conductive to office use. By the use of the high sensitivity imaging materials of this invention, considerably less laser energy is required for laser imaging. As a result, lower powered and less expensive laser equipment may be utilized which is conducive to office use. Continuous tone or gray scale imaging can be obtained in accordance with this invention by controlling the intensities of the intensity modulated laser beam.

The energy may also comprise Joule heat energy applied to the film by means of, for example, direct electrical heating, electrically energized heating means or the like and absorbed in the film. The heating means may include a single heating point which serially scans the film and which is intensity modulated, or it may comprise an advanceable matrix of heating points which are intensity modulated. By the use of the high sensitivity imaging films of this invention, considerably less energy is required for imaging the film thereby decreasing substantially the heating of the film and eliminating damage to the film which might be occassioned by overheating the same. Continuous tone or gray scale imaging can be obtained in accordance with this invention by controlling the intensities of the intensity modulations of the heating means.

The use of the high sensitivity imaging materials of this invention is also highly beneficial where non-coherent radiant energy from a Xenon flash lamp or the like is applied through an imaging mask to such films. Here, also, a lesser amount of imaging energy is required so that the Xenon flash lamp or the like need not be operated near its upper limits. As a result, more even application of the Xenon flash energy through the mask with less possible distortion to the high sensitivity film is provided and the operation life of the Xenon flash lamp is greatly extended. Where the energy is applied in a short pulse, the pulse width may be within the range of about 30 microseconds to about 10 milliseconds, with a pulse width of about 100 microseconds giving exceedingly satisfactory results, and at which the sensitivity measurements herein were made. Generally, the maximum optical densities of the imaging films where Joule heat energy is utilized is greater than for the imaging films where radiant energy is utilized, as for example, optical densities of 2 to 2.5 for the former as compared to 1 to 1.5 for the latter.

Where a fully formatted microfiche card is desired for micro-imaging information thereon in accordance with the imaging methods of this invention, the overcoat film 12 which is deposited on the film of imaging material 11 on the substrate 10 may comprise a photoresist material such as polyvinylcinnamate, for example, a Kodak KPR-4 photoresist manufactured and sold by Eastman-Kodak Company, this photoresist being negative working. The imaging film with such overcoat film is exposed through a master mask with the U.V., and the negative resist overcoat is U.V. activated with substantially $10^6$ ergs/cm$^2$ energy applied to the overcoat film. Where the U.V. energy is applied to the overcoat film, the overcoat film is rendered non-light sensitive and insensitive to subsequent solutions utilized in the development of the film.

The film is developed by passing the same through a Kodak orthoresist developer which removes the nonexposed portions of the overcoat film but leaving intact the exposed portions. The film is then rinsed and dried by evaporation. Thereafter, the film is passed through a solution, for example, of 10 percent ferric chloride in water and the exposed metal is etched thereby. Following the etching, the film is rinsed and dried. Thereafter, a release coat of Gantrez of GAF (AN 8194) in a substantially 4 percent toluene is applied to the outer surfaces of the film to a thickness of about 0.1 micron for the purpose of preventing sticking of the fiche cards together and to the intermediate mask film by which it is to be later imaged. The release coat may be applied by spin coating, roller coating, spray coating or the like. This fully formatted film is then cut to standard fiche card size.

The fiche card may include substantially opaque areas upon which the micro-imaged information may be applied in accordance with this invention and clear transparent margins therearound. The edges of the fiche card may be clear but still containing substantially opaque numbers and letters for indicating columns and rows. A portion of the fiche card may be made transparent so as to readily place thereon title information relating to the fiche card. Portions of the fiche card may contain indentifying monograms and the like. Other portions of the fiche card may remain substantially opaque so that they can receive retrieval code information by the imaging method of this invention.

While for purposes of illustration various forms of this invention have been disclosed, other forms thereof may become apparent to those skilled in the art upon reference to this disclosure and, therefore, this invention should be limited only by the scope of the appended claims.

We claim:

1. A dry process high sensitivity imaging film comprising a substrate, and a solid, high optical density and substantially opaque film of a dispersion imaging material deposited on said substrate and including at least two separate and different metal layers of different and substantially mutually insoluble metal components having relatively high melting points and relatively low melting point eutectics and interfaces between said layers having relatively low melting points, the metal component of one of said metal layers being at least bismuth, tin, lead, cadmium or zinc, and the metal component of another of said metal layers being different from that of said one of said metal layers and being at least bismuth, tin, lead, cadmium or zinc, said film of dispsersion imaging material, upon application of energy in an amount above a certain critical value sufficient to increase the absorbed energy in the film material above a certain critical temperature value related to the relatively low melting points of the interfaces, changing to a substantially fluid state in which the surface tension of the film material acts to cause the substantially opaque film, where subject to said energy, to disperse and change to a discontinuous film comprising openings and deformed material which are frozen in place following said application of energy and through which openings light can pass for decreasing the optical density thereat.

2. A dry process high sensitivity imaging film as defined in claim 1, wherein the interfaces between said layers include the energy of mixing of the separate metal components at the interfaces for providing the interfaces with low melting points.

3. A dry process high sensitivity imaging film as defined in claim 1, wherein the interfaces between said layers include a layer of a eutectic mixture of the separate metal components for providing the interfaces with low melting points.

4. A dry process high sensitivity imaging film as defined in claim 1, wherein the atomic weight percents of the respective metal components of the separate layers of the dispersion imaging material correspond substantially to the atomic weight percents of the eutectic of said metal components.

5. A dry process high sensitivity imaging film as defined in claim 1, wherein the atomic weight percents of the respective metal components of the separate layers of the dispersion imaging material are substantially different from the atomic weight percents of the eutectic of said metal components.

6. A dry process high sensitivity imaging film as defined in claim 1, wherein said film of dispersion imaging material, upon application of energy in an amount above a certain critical value sufficient to increase the absorbed energy in the film material above a certain critical temperature value related to the relatively low-melting points of the interfaces, substantially melts the low melting point interfaces and incorporates the different and substantially mutually insoluble metal components of the separate layers into the substantially molten interfaces for changing said film to the substantially fluid state.

7. A dry process high sensitivity imaging film as defined in claim 6, wherein the atomic weight percents of the respective metal components of the separate layers of the dispersion imaging material correspond substantially to the atomic weight percents of the eutectic of said metal components, whereby substantially all of the metal components of the separate layers are incorporated into the substantially molten interfaces.

8. A dry process high sensitivity imaging film as defined in claim 6, wherein the atomic weight percents of the respective metal components of the separate layers of the dispersion imaging material are substantially different from the atomic weight percents of the eutectic of said metal components, whereby some of the excess metal components of the separate layers are not completely incorporated into the substantially molten interfaces substantially at said certain critical temperature value.

9. A dry process high sensitivity imaging film as defined in claim 1, wherein the dispersion imaging material comprises two separate layers.

10. A dry process high sensitivity imaging film as defined in claim 1, wherein the dispersion imaging material comprises three or more separate layers.

11. A dry process high sensitivity imaging film as defined in claim 1, including an overcoat film deposited over the film of dispersion imaging material.

12. A dry process high sensitivity imaging film as defined in claim 1, including means associated with said film of dispersion imaging material for retarding the dispersion and change to the discontinuous film, caused by the surface tension, and for controlling the amount of such dispersion and change in accordance with the intensity of the applied energy above said certain critical value, to increase the amount of said change and the area of the openings in the film and decrease the area of the deformed material in the film and, therefore, the optical density of the film in accordance with the intensity of the applied energy above said certain critical value for providing continuous tone imaging of the dry process imaging film.

13. A dry process high sensitivity imaging film as defined in claim 12, wherein said retarding and controlling means comprises the separate layers of the film of dispersion imaging material wherein the atomic weight percents of the respective metal components of the separate layers are substantially different from the atomic weight percents of the eutectic of said metal components, whereby some of the excess metal components of the several layers are not completely incorporated into the substantially molten interfaces.

14. A dry process high sensitivity imaging film as defined in claim 12, wherein said retarding and controlling means comprises the interfacial adhesion between the substrate and the film of dispersion imaging material deposited on the substrate.

15. A dry process high sensitivity imaging film as defined in claim 12, wherein said retarding and controlling means comprises an overcoat film deposited on the film of dispersion imaging material and the interfacial adhesion between the film of dispersion material and the overcoat film deposited thereon.

16. A dry process high sensitivity imaging film as defined in claim 1 wherein the metal components of the separate layers include bismuth and tin.

17. A dry process high sensitivity imaging film as defined in claim 1, wherein said substrate comprises a polyester material.

18. A dry process high sensitivity film comprising a substrate, and a solid, high optical density and substantially opaque film of a dispersion imaging material deposited on said substrate and including a plurality of separate layers of different and substantially mutually insoluble metal components having relatively high melting points and relatively low melting points eutectics and interfaces between said layers having relatively low melting points, said film of dispersion imaging material, upon application of energy in an amount above a certain critical value sufficient to increase the absorbed energy in the film material above a certain critical temperature value related to the relatively low melting points of the interfaces, changing to a substantially fluid state in which the surface tension of the film material acts to cause the substantially opaque film, where subject to said energy, to disperse and change to a discontinuous film comprising openings and deformed material which are frozen in place following said application of energy and through which openings light can pass for decreasing the optical density thereat, said film of dispersion imaging film also including other solid materials which are capable of remaining solid when said film of dispersion imaging material is changed to its substantially fluid state.

19. A dry process high sensitivity imaging film as defined in claim 18, herein said other solid materials comprise oxides of said substantially mutually insoluble metal components of said separate layers.

20. A dry process high sensitivity imaging film as defined in claim 18, wherein said film of dispersion imaging material, upon application of energy in an amount above a certain critical value sufficient to increase the absorbed energy in the film material above a certain critical temperature value related to the relatively low-melting points of the interfaces, substantially melts the low melting point interfaces and incorporates the different and substantially mutually insoluble metal components of the separate layers into the substantially molten interfaces for changing said film to the substantially fluid state.

21. A dry process high sensitivity imaging film as defined in claim 20, wherein said other solid materials comprise oxides of said substantially mutually insoluble metal components of said separate layers.

22. A dry process high sensitivity imaging film comprising a substrate, and a solid, high optical density and substantially opaque film of a dispersion imaging material deposited on said substrate and including a plurality of separate layers of different and substantially mutually insoluble metal components having relatively high melting points and relatively low melting point eutectics and interfaces between said layers having relatively low melting points, said film of dispersion imaging material, upon application of energy in an amount above a certain critical value sufficient to increase the absorbed energy in the film material above a certain critical temperature value related to the relatively low melting points of the interfaces, changing to a substantially fluid state in which the surface tension of the film material acts to cause the substantially opaque film, where subject to said energy, to disperse and change to a discontinuous film comprising openings and deformed material which are frozen in place following said application of energy and through which openings light can pass for decreasing the optical density thereat, said film of dispersion imaging material comprising a plurality of sets of separate layers of different and substantially mutually insoluble metal components, and layers of a solid material interposed between said sets of layers, which solid material is capable of remaining solid when said film of dispersion imaging material is changed to its substantially fluid state.

23. A dry process high sensitivity imaging film comprising a substrate, and a solid, high optical density and substantially opaque film of a dispersion imaging material deposited on said substrate and including a plurality of separate layers of different and substantially mutually insoluble metal components having relatively high melting points and relatively low melting point eutectics and interfaces between said layers having relatively low melting points, said film of dispersion imaging material, upon application of energy in an amount above a certain critical value sufficient to increase the absorbed energy in the film material above a certain critical temperature value related to the relatively low melting points of the interfaces, changing to a substantially fluid state in which the surface tension of the film material acts to cause the substantially opaque film, where subject to said energy, to disperse and change to a discontinuous film comprising openings and deformed material which are frozen in place following said application of energy and through which openings light can pass for decreasing the optical density thereat, and a passivating layer deposited on the film of dispersion imaging material.

24. A dry process high sensitivity imaging film as defined in claim 23, including an overcoat film deposited on the passivating layer.

25. A dry process high sensitivity imaging film as defined in claim 23, wherein said passivating layer comprises SiO, $SiO_2$, $Al_2O_3$, $GeO_2$, $TeO_2$, $SnO_2$ or $Bi_2O_3$.

26. A dry process high sensitivity imaging film comprising a substrate, and a solid, high optical density and substantially opaque film of a dispersion imaging material deposited on said substrate and including a plurality of separate layers of different and substantially mutually insoluble metal components having relatively high melting points and relatively low melting point eutectics and interfaces between said layers having relatively low melting points, said film of dispersion imagining material, upon application of energy in an amount above a certain critical value sufficient to increase the absorbed energy in the film material above a certain critical temperature value related to the relatively low melting points of the interfaces, changing to a substantially fluid state in which the surface tension of the film material acts to cause the substantially opaque film, where subject to said energy, to disperse and change to a discontinuous film comprising openings and deformed material which are frozen in place following said application of energy and through which openings light can pass for decreasing the optical density thereat, said substrate including a passivating layer deposited thereon which is between the substrate and the film of dispersion imaging material.

27. A dry process high sensitivity imaging film as defined in claim 26, including a passivating layer deposited on the film of dispersion imaging material.

28. A dry process high sensitivity imaging film as defined in claim 27, wherein the interfaces between said layers include a layer of a eutectic mixture of the separate metal components for providing the interfaces with low melting points.

29. A dry process high sensitivity imaging film as defined in claim 26, wherein said passivating layer comprises SiO, $SiO_2$, $Al_2O_3$, $GeO_2$, $TeO_2$, $SnO_2$ or $Bi_2O_3$.

30. A dry process high sensitivity imaging film comprising a substrate, and a solid, high optical density and substantially opaque film of a dispersion imaging material deposited on said substrate and including a plurality of separate layers of different and substantially mutually insoluble metal components having relatively high melting points and relatively low melting point eutectics and interfaces between said layers having relatively low melting points, said film of dispersion imaging material, upon application of energy in an amount above a certain critical value sufficient to increase the absorbed energy in the film material above a certain critical temperature value related to the relatively low melting points of the interfaces changing to a substantially fluid state in which the surface tension of the film material acts to cause the substantially opaque film, where subject to said energy, to disperse and change to a discontinuous film comprising openings and deformed material which are frozen in place following said application of energy and through which openings light can pass for decreasing the optical density thereat, means associated with said film of dispersion imaging material for retarding the dispersion and change to the discontinuous film, caused by the surface tension, and for controlling the amount of such dispersion and change in accordance with the intensity of the applied energy above said certain critical value, to increase the amount of said change and the area of the openings in the film and decrease the area of the deformed material in the film and, therefore, the optical density of the film in accordance with the intensity of the applied energy above said certain critical value for providing continuous tone imaging of the dry process imaging film, and said retarding and controlling means comprising including in said film of dispersion imaging film other solid materials which are capable of remaining solid when said film of dispersion imaging material is changed to its substantially fluid state.

31. A dry process high sensitivity imaging film as defined in claim 30, wherein said other solid materials comprise oxides of said substantially mutually insoluble metal components of said separate layers.

32. A dry process high sensitivity imaging film comprising a substrate, and a solid, high optical density and substantially opaque film of a dispersion imaging material deposited on said substrate and including a plurality of separate layers of different and substantially mutually insoluble metal components having relatively high melting points and relatively low melting point eutectics and interfaces between said layers having relatively low melting points, said film of dispersion imaging material, upon application of energy in an amount above a certain critical value sufficient to increase the absorbed energy in the film material above a certain critical temperature value related to the relatively low melting points of the interfaces, changing to a substantially fluid state in which the surface tension of the film material acts to cause the substantially opaque film, where subject to said energy, to disperse and change to a discontinuous film comprising openings and deformed material which are frozen in place following said application of energy and through which openings light can pass for decreasing the optical density thereat, means associated with said film of dispersion imaging material for retarding the dispersion and change to the discontinuous film, caused by the surface tension, and for controlling the amount of such dispersion and change in accordance with the intensity of the applied energy above said certain critical value, to increase the amount of said change and the area of the openings in the film and decrease the area of the deformed material in the film and, therefore, the optical density of the film in accordance with the intensity of the applied energy above said certain critical value for providing continuous tone imaging of the dry process imaging film, and said retarding and controlling means comprising a plurality of sets of the separate layers of different and substantially mutually insoluble metal components, and layers of a solid material interposed between said sets of layers, which solid material is capable of remaining solid when said film of dispersion imaging material is changed to its substantially fluid state.

33. A dry process high sensitivity imaging film comprising a substrate, and a solid, high optical density and substantially opaque film of a dispersion imaging material deposited on said substrate and including a plurality of separate layers of different and substantially mutually insoluble metal components having relatively high melting points and relatively low melting point eutectics and interfaces between said layers having relatively low melting points, said film of dispersion imaging material, upon application of energy in an amount above a certain critical value sufficient to increase the absorbed energy in the film material above a certain critical temperature value related to the relatively low melting points of the interfaces, changing to a substantially fluid state in which the surface tension of the film material acts to cause the substantially opaque film, where subject to said energy, to disperse and change to a discontinuous film comprising openings and deformed material which are frozen in place following said application of energy and through which openings light can pass for decreasing the optical density thereof, said metal components of the separate layers including bismuth and tin, and said separate layers also including oxides of bismuth and tin.

34. A dry process high sensitivity imaging film comprising a substrate, and a solid, high optical density and substantially opaque film of a dispersion imaging material deposited on said substrate and including a plurality of separate layers of different and substantially mutual metal components having relatively high melting points and relatively low melting point eutectics and interfaces between said layers having relatively low melting points, said film of dispersion imaging material, upon application of energy in an amount above a certain critical value sufficient to increase the absorbed energy in the film material above a certain critical temperature value related to the relatively low melting points of the interfaces, changing to a substantially fluid state in which the surface tension of the film material acts to cause the substantially opaque film, where subject to said energy, to disperse and change to a discontinuous film comprising openings and deformed material which are frozen in place following said application of energy and through which openings light can pass for decreasing the optical density thereat, an overcoat film deposited over the film of dispersion imaging material, said overcoat film comprising a polymer resin.

* * * * *